(12) United States Patent
Jakupca et al.

(10) Patent No.: US 9,745,425 B2
(45) Date of Patent: Aug. 29, 2017

(54) CYCLOALIPHATIC POLYPHOSPHITE

(71) Applicant: Dover Chemical Corporation, Dover, OH (US)

(72) Inventors: Michael R. Jakupca, Canton, OH (US); Jacob M. Lance, New Philadelphia, OH (US); Donald R. Stevenson, Dover, OH (US)

(73) Assignee: Dover Chemical Corporation, Dover, OH (US)

( * ) Notice: Subject to any disclaimer, the term of this patent is extended or adjusted under 35 U.S.C. 154(b) by 0 days.

(21) Appl. No.: 14/309,042

(22) Filed: Jun. 19, 2014

(65) Prior Publication Data

US 2014/0378590 A1 Dec. 25, 2014

Related U.S. Application Data

(63) Continuation-in-part of application No. 13/921,841, filed on Jun. 19, 2013, now Pat. No. 8,981,042.

(60) Provisional application No. 61/671,427, filed on Jul. 13, 2012, provisional application No. 61/663,323, filed on Jun. 22, 2012.

(51) Int. Cl.
| | |
|---|---|
| *C08G 79/04* | (2006.01) |
| *C08L 85/02* | (2006.01) |
| *C08L 23/00* | (2006.01) |
| *C08L 23/12* | (2006.01) |
| *C08L 23/06* | (2006.01) |
| *C08G 65/335* | (2006.01) |
| *C08K 5/524* | (2006.01) |

(52) U.S. Cl.
CPC ......... *C08G 79/04* (2013.01); *C08G 65/3353* (2013.01); *C08K 5/524* (2013.01); *C08L 23/06* (2013.01); *C08L 23/12* (2013.01); *C08L 85/02* (2013.01); *C08L 2201/08* (2013.01)

(58) Field of Classification Search
CPC .......... C08G 79/02; C08G 79/04; C08L 85/02
See application file for complete search history.

(56) References Cited

U.S. PATENT DOCUMENTS

| | | | |
|---|---|---|---|
| 3,210,319 A | 10/1965 | Huhn et al. | |
| 3,359,348 A | 12/1967 | Friedman | |
| 3,378,524 A | 4/1968 | Larrison | |
| 3,855,360 A | 12/1974 | Shim | |
| 4,221,700 A | 9/1980 | Minagawa et al. | |
| 5,969,015 A | 10/1999 | Zinke et al. | |
| 6,541,549 B2 | 4/2003 | Archibald et al. | |
| 6,770,693 B2 | 8/2004 | Stein et al. | |
| 7,119,170 B2 | 10/2006 | Feder et al. | |
| 7,186,853 B2 | 3/2007 | Enlow et al. | |
| 7,199,170 B2 | 4/2007 | Archibald et al. | |
| 7,468,410 B2 | 12/2008 | Chafin et al. | |
| 8,981,042 B2 * | 3/2015 | Jakupca ................. | C08G 79/04 525/188 |
| 2007/0088108 A1 | 4/2007 | Evans et al. | |
| 2008/0071016 A1 | 3/2008 | Boettcher et al. | |
| 2009/0326112 A1 | 12/2009 | Gelbin et al. | |
| 2010/0004363 A1 | 1/2010 | Gelbin et al. | |
| 2010/0025636 A1 | 2/2010 | Gelbin et al. | |
| 2010/0069542 A1 | 3/2010 | Gelbin et al. | |
| 2010/0076131 A1 | 3/2010 | Gelbin et al. | |
| 2010/0190900 A1 | 7/2010 | Gelbin et al. | |
| 2010/0240810 A1 | 9/2010 | King et al. | |
| 2011/0263760 A1 * | 10/2011 | Jakupca ................. | C08G 79/04 524/91 |

FOREIGN PATENT DOCUMENTS

| | | |
|---|---|---|
| WO | 2007009916 A1 | 1/2007 |
| WO | 2008028858 A1 | 3/2008 |

OTHER PUBLICATIONS

International Search Report and Written Opinion dated Mar. 3, 2011 for corresponding application PCT/US10/53207.
Dr. Michael Jakupca et al., "Ancillary Benefits of an Alkylphenol-Free High Molecular Weight Phosphite Stabilizer" presented at SPE Polyolefins Conference 2012; Houston, Texas; Feb. 26-29, 2012.
International Preliminary Report on Patentability for corresponding application PCT/US10/53207 dated Aug. 21, 2012.
Trans-1,4-cyclohexylene diisocyanate information. Sigma Aldrich. http://www.sigmaaldrich.com/catalog/product/aldrich/269360?lang=en&region=US. As viewed on Sep. 30, 2014.
4-(2-propenyl)benzoic acid information. Sigma Aldrich. http://www.sigmaaldrich.com/catalog/product/aldrich/cds019298?lang=en&region=US. As viewed on Oct. 1, 2014.

\* cited by examiner

*Primary Examiner* — Robert C Boyle
*Assistant Examiner* — Stephen Rieth
(74) *Attorney, Agent, or Firm* — FisherBroyles, LLP; Louis F. Wagner

(57) ABSTRACT

A polymeric polyphosphite and copolymeric polyphosphite is described which contains a cycloaliphatic moiety, preferably cyclohexane dimethanol, in the polyphosphite backbone chain. Incorporation of the polymeric polyphosphite into synthetic polymers reduces the yellowness index of any polymer into which the polymeric polyphosphite additive has been added, as well as increased hydrolytic stability as well as increased resistance to migration in food packaging.

13 Claims, No Drawings

CYCLOALIPHATIC POLYPHOSPHITE

CROSS-REFERENCE TO RELATED APPLICATIONS

This invention is a continuation-in-part of, claims priority to and fully incorporates by reference, U.S. patent application Ser. No. 13/921,841 filed on 19 Jun. 2013, which claims priority to U.S. Provisional Patent Application Ser. Nos. 61/663,323 filed on 22 Jun. 2012 and 61/671,427 filed on 13 Jul. 2012.

TECHNICAL FIELD

The invention described herein pertains generally to an improved polymer composition which contains at least one polyphosphite additive having a cycloaliphatic moiety in the polyphosphite.

BACKGROUND OF THE INVENTION

Organic phosphites are known for their antioxidant properties when added to polymers and other organic materials. At least one purpose associated with the addition of a stabilizer to a polymeric resin is to prevent deterioration of the polymers derived from the resin during processing at high temperatures and also to permit the manufacture of products with increased intrinsic quality attributable at least in part to increased resistance to thermal and light degradation during their intended use.

Organic phosphites can be synthesized from variety of alcohols, diols, triols, and alkylphenols. Among them are the commercially significant phosphites, tris(nonylphenyl)phosphite (TNPP) and tris(2,4-di-t-butylphenyl)phosphite. Historically, these two phosphites have been the low cost stabilizers for the rubber and plastics industry. Recently, however, alkylphenols and phosphites made from them have come under scrutiny due to concerns about them being xeno-estrogenic and bio-accumulative. Therefore suitable replacements for these are desired.

It has been determined that many useful polyphosphites can be synthesized based on cycloaliphatic diols, e.g., cylcohexane dimethanol ("CHDM"), and which are suitable replacements for the alkylphenol containing phosphites. The phosphites made at least in part from CHDM are superior to many of the commercial phosphites in terms of performance, thermal stability, and hydrolyic stability. Furthermore a great variety of phosphites can be produced from cycloaliphatic diols (e.g., CHDM) having a variety of properties.

Therefore what is disclosed are solid and liquid polyphosphites synthesized at least in part from saturated cycloaliphatic reactants (e.g., cycloaliphatic diols), mono-hydroxy terminated alcohols acting as chain stoppers and trifunctional phosphorus moieties (e.g., triaryl phosphite) and their performance as stabilizers.

SUMMARY OF THE INVENTION

The novel phosphites described herein are suitable for stabilization of organic materials against oxidative, thermal or actinic degradation. At least one advantage of the technology resides in the recognition that phosphites which are based on cycloaliphatic diols such as CHDM, have high percentages of phosphorus and therefore are very effective antioxidants. CHDM in particular, is also a versatile raw material which allows for a wide range of products suitable for a number of applications to be synthesized.

For instance, in certain polyolefins it is desirable to have high molecular weight solid or liquid polymeric or oligomeric phosphites so that migration and blooming from the polymer is minimized. High thermal stability and hydrolytic stability is also very important due to the high processing temperatures. Mid to high molecular weight phosphites of the general structures described herein fulfill all of these requirements for polyolefins. Also it is possible to synthesize both a solid and a liquid polyphosphite by adding an appropriate alcohol in combination with the CHDM. Alcohols with a carbon chain length greater than 16 tend to produce solid polyphosphites while an alcohol with a carbon chain length less than 16 tends to produce a liquid polyphosphites.

Polyphosphites with a high hydroxyl number can be suitable in polyurethanes for use as an anti-scorch agent as well as flame lamination additives. CHDM phosphites of the general structures described herein can be synthesized with a suitable hydroxyl number so as to be useful additives in polyurethanes.

Low and high molecular weight polyphosphites of the general structures described herein show excellent compatibility and stabilization in PVC. Phosphites of these general structures impart excellent color stability and increase thermal stabilization in PVC.

These and other objects of this invention will be evident when viewed in light of the detailed description and appended claims.

DETAILED DESCRIPTION OF THE INVENTION

The best mode for carrying out the invention will now be described for the purposes of illustrating the best mode known to the applicant at the time of the filing of this invention. The examples and figures are illustrative only and not meant to limit the invention, as measured by the scope and spirit of the claims.

As used herein, and unless otherwise stated, the term "alkyl" means straight and branched chain saturated acyclic hydrocarbon monovalent groups; said alkyl group may further optionally include one or more suitable substituents independently selected from the group consisting of amino, halogen, hydroxy, sulfhydryl, haloalkyl, alkoxy and the like. Specific non-limiting examples of straight-chain or branched alkyl groups are $C_{1-20}$ alkyls, e.g., methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl and stearyl groups. It is recognized that the alkyl may be interrupted with oxygen, sulfur or nitrogen, a non-limiting examples for which the interspersed groups include: $CH_3-O-CH_2CH_2-$, $CH_3-S-CH_2CH_2-$, $CH_3-N(CH_3)-CH_2CH_2-$, $CH_3-O-CH_2CH_2-O-CH_2CH_2-$, $CH_3-(O-CH_2CH_2-)_2O-CH_2CH_2-$, $CH_3-(O-CH_2CH_2-)_3O-CH_2CH_2-$ or $CH_3-(O-CH_2CH_2-)_4O-CH_2CH_2-$.

As used herein, and unless otherwise stated, the term "alkenyl" means straight and branched chain unsaturated acyclic hydrocarbon monovalent groups; said alkenyl group may further optionally include one or more suitable substituents independently selected from the group consisting of amino, halogen, hydroxy, sulfhydryl, haloalkyl, alkoxy and the like. Specific non-limiting examples of the straight-chain or branched alkenyl groups are those having 2 to 30 carbon atoms wherein the position of the double bond may vary, such as butenyl, pentenyl, hexenyl, heptenyl, octenyl, nonenyl, decenyl, undecenyl, dodecenyl, tridecenyl, tetradecenyl, pentadecenyl, hexadecenyl, heptadecenyl, and octadecenyl groups. It is once again, recognized that the alkenyl may be interrupted with oxygen, sulfur or nitrogen, non-limiting examples for which the interspersed groups include: —$CH_2$—O—$CH_2$—, —$CH_2$—S—$CH_2$—, —$CH_2$—N($CH_3$)—$CH_2$—, —$CH_2$—O—$CH_2CH_2$—, —$CH_2CH_2$—O—$CH_2CH_2$—, —$CH_2CH_2$—O—$CH_2CH_2$—O—$CH_2CH_2$—, —$CH_2CH_2$—(O—$CH_2CH_2$—)$_2$O—$CH_2CH_2$—, —$CH_2CH_2$—(O—$CH_2CH_2$—)$_3$O—$CH_2CH_2$—, —$CH_2CH_2$—(O—$CH_2CH_2$—)$_4$O—$CH_2CH_2$—, —$CH_2CH_2$—S—$CH_2CH_2$— or —$CH_2CH_2$—N($CH_3$)—$CH_2CH_2$—.

As used herein, and unless otherwise stated, the terms "cycloaliphatic" refer to a mono- or polycyclic saturated hydrocarbon monovalent group having from 3 to 10 carbon atoms, or a $C_{7-10}$ polycyclic saturated hydrocarbon monovalent group having from 7 to 10 carbon atoms. Specific non-limiting examples of the cycloaliphatic or cyclic alkyl groups which may have substituents are cycloalkyl groups having 5 to 7 carbon atoms such as cyclopentyl, cyclohexyl and cycloheptyl groups, and the alkylcycloalkyl groups having 6 to 11 carbon atoms wherein the position of the alkyl group may vary, such as methylcyclopentyl, dimethylcyclopentyl, methylethylcyclopentyl, dimethylcyclopentyl, methylcyclohexyl, dimethylcyclohexyl, methylethylcyclohexyl, diethylcyclohexyl, methylcycloheptyl, dimethylcycloheptyl, methylcycloheptyl, and diethylcycloheptyl groups. It is once again, recognized that the cycloaliphatic may be interrupted with oxygen and/or carbonyl groups (e.g., lactones), or other non-interfering atoms.

As used herein, and unless otherwise stated, the term "alkoxy" refer to substituents wherein an alkyl group is attached to an oxygen atom through a single bond.

As used herein, and unless otherwise stated, the terms "halo" or "halogen" means any atom selected from the group consisting of fluoro, chloro, bromo and iodo.

The present invention is directed at least in part to solid and liquid phosphites which are comprised at least in part from saturated cycloaliphatic reactants (e.g., cycloaliphatic diols, more preferred, cyclohexane dimethanol ("CHDM")).

Cyclohexane dimethanol is a cyclohexane ring with two methanol groups bonded to any position on the ring, as illustrated by general structure (I).

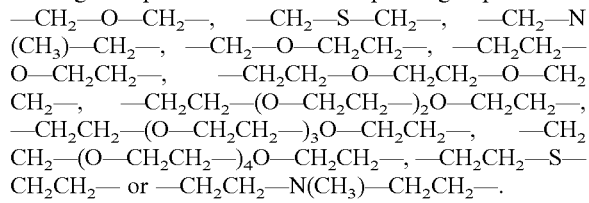

It should be recognized that CHDM of either the cis or trans isomer may be used as a reactant or combinations thereof. While CHDM is the focus of much of the description of the invention, the invention is not limited to such, and in fact, includes other "cycloaliphatic diol based" derivatives, e.g., cyclopentane dimethanol, cyclopentane diethanol, cyclopentane dipropanol, cyclopentane dibutanol, cyclopentane dipentanol, cyclohexane diethanol, cyclohexane dipropanol, cyclohexane dibutanol, cyclohexane dipentanol, cycloheptane dimethanol, cycloheptane diethanol, cycloheptane dipropanol, cycloheptane dibutanol, cycloheptane dipentanol, cyclooctane dimethanol, cyclooctane diethanol, cyclooctane dipropanol, cyclooctane dibutanol, and cyclooctane dipentanol.

In a more generic sense, the cycloaliphatic diol based component is HO—$[R^7]_a$—$R^8$—$[R^9]_b$—OH, Structure II, where $R^7$, $R^8$, $R^9$, a & b are as defined below. In a preferred aspect of the invention, $R^7$ and $R^9$ are $CH_2$ groups and a & b are 1.

wherein
(i) $R^7$ and $R^9$ independently selected from the group consisting of straight and branched $C_{1-6}$ alkylene groups;
(ii) $R^8$ is selected from the group consisting of $C_{5-10}$ saturated carbocyclic rings; and
(iii) a and b are 0 and 1.

In one aspect, the invention provides a polymeric polyphosphite containing from 2 to 1000 repeating units of the formula:

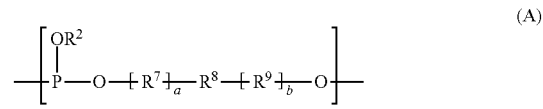

in which $R^2$ is selected from the group consisting of
(i) a $C_{1-20}$alkyl group or $C_{3-22}$alkenyl group which is optionally interrupted or terminated by a $C_{5-10}$ cycloalkyl or cycloalkenyl group,
(ii) a $C_{2-22}$polyalkylene glycol chain optionally terminated by a $C_{1-4}$alkyl group, and
(iii) a 3 to 7 membered ring containing a —CO—O— group and optionally substituted by a $C_{1-20}$ alkyl group;
(iv) a $C_{6-40}$ cycloalkyl, a $C_6$ aryl, a $C_{6-40}$ aryl alkyl;
(v) Y—OH;
each of $R^7$ and $R^9$ independently represents a $C_{1-6}$ alkylene group;
$R^8$ is selected from the group consisting of $C_{5-10}$ saturated carbocyclic rings; and
a and b are independently selected from the group consisting of 0 and 1;
and from 0 to 1000 repeating units of the formula:

in which
Y is selected from the group consisting of a $C_{2-40}$ alkylene group, a $C_{2-40}$ alkyl lactone, a $C_{3-40}$ cycloalkylene group, a $C_6$ arylene group, and a $C_{6-40}$ aryl alkylene and
m ranges from 1 to 20;
said polyphosphite being terminated adjacent the —P(O$R^2$)— group of the formula above by a group $R^1$O—, and terminated at the other end of the chain by a group —P(O$R^3$)(O$R^4$), in which each of $R^1$, $R^3$, and $R^4$, which may be the same or different, has one of the meanings given for $R^2$; and
provided that when said polyphosphite contains more than 1 but less than or equal to 12 units of Formula B, it must contain 2 or more units of Formula A; and further provided that when said polyphosphite contains no units of Formula B, it must contain 8 or more units of Formula A.

In one embodiment, the invention provides a polymeric polyphosphite containing from 8 to 1000 repeating units of the formula:

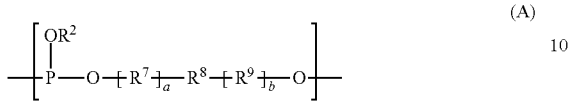

(A)

in which:
R$^2$ is selected from the group consisting of
(i) a C$_{1-20}$ alkyl group or C$_{3-22}$ alkenyl group which is optionally interrupted or terminated by a C$_{5-10}$ cycloalkyl or cycloalkenyl group,
(ii) a C$_{2-22}$ polyalkylene glycol chain optionally terminated by a C$_{1-4}$ alkyl group, and
(iv) a 3 to 7 membered ring containing a —CO—O— group and optionally substituted by a C$_{1-20}$ alkyl group;
(iv) a C$_{6-40}$ cycloalkyl, a C$_6$ aryl, a C$_{6-40}$ aryl alkyl;
(v) Y—OH;
each of R$^7$ and R$^9$ independently represents a C$_{1-6}$ alkylene group;
R$^8$ is selected from the group consisting of C$_{5-10}$ saturated carbocyclic rings; and
a and b are independently selected from the group consisting of 0 and 1;
Y is selected from the group consisting of a C$_{2-40}$ alkylene group, a C$_{2-40}$ alkyl lactone, a C$_{3-40}$ cycloalkylene group, a C$_6$ arylene group, and a C$_{6-40}$ aryl alkylene; and
said polyphosphite being terminated adjacent the —P(OR$^2$)— group of the formula above by a group R$^1$O—, and terminated at the other end of the chain by a group —P(OR$^3$)(OR$^4$), in which each of R$^1$, R$^3$, and R$^4$, which may be the same or different, has one of the meanings given for R$^2$;
and no units of the Formula B.

In an alternative embodiment, the invention provides a polymeric polyphosphite containing from 2 to 1000 repeating units of the formula:

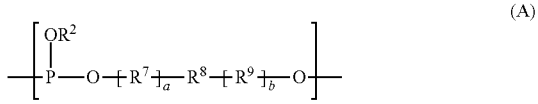

(A)

and from 8 to 1000 repeating units of the formula:

(B)

in which:
each R$^2$ is independently selected from the group consisting of
(i) a C$_{1-20}$ alkyl group or C$_{3-22}$ alkenyl group which is optionally interrupted or terminated by a C$_{5-10}$ cycloalkyl or cycloalkenyl group, (ii) a C$_{2-22}$ polyalkylene glycol chain optionally terminated by a C$_{1-4}$ alkyl group, and
(v) a 3 to 7 membered ring containing a —CO—O— group and optionally substituted by a C$_{1-20}$ alkyl group;
(iv) a C$_{6-40}$ cycloalkyl, a C$_6$ aryl, a C$_{6-40}$ aryl alkyl;
(v) Y—OH;
each of R$^7$ and R$^9$ independently represents a C$_{1-6}$ alkylene group;
R$^8$ is selected from the group consisting of C$_{5-10}$ saturated carbocyclic rings;
a and b are independently selected from the group consisting of 0 and 1;
Y is selected from the group consisting of a C$_{2-40}$ alkylene group, a C$_{2-40}$ alkyl lactone, a C$_{3-40}$ cycloalkylene group, a C$_6$ arylene group, and a C$_{6-40}$ aryl alkylene; and
m is from 1 to 20;
said polyphosphite being terminated adjacent the —P(OR$^2$)— group of the formula above by a group R$^1$O—, and terminated at the other end of the chain by a group —P(OR$^3$)(OR$^4$), in which each of R$^1$, R$^3$, and R$^4$, which may be the same or different, has one of the meanings given for R$^2$.

If formula B is present, Y preferably represents a —CH$_2$CH$_2$— or —CH(CH$_3$)CH$_2$— group, and m is preferably from 5 to 20.

Preferably R$^2$ represents a C$_{10-20}$, especially a C$_{12}$ to C$_{18}$, alkyl group, a C$_{16}$ to C$_{18}$ alkenyl group, or a C$_{2-10}$ polyalkylene glycol chain terminated by a C$_{1-4}$alkyl group, for example a polyethylene glycol chain of molecular weight 350 terminated by a methyl group, or a tripropylene glycol chain terminated by a butyl group. Most preferably R$^2$ represents a C$_{12}$ to C$_{18}$ alkyl group.

Preferably R$^7$ and R$^9$ are each ethylene or, especially, methylene groups. Preferably a and b both represent 1. Preferably R$^8$ is a C$_{5-7}$ cycloalkylene group, most preferably a cyclohexylene group. Preferably the polyphosphite of the invention contains from 10 to 1,000 units of the formula A.

A preferred group of compounds of the invention are polymeric polyphosphites in which R$^2$ represents a C$_{10}$-C$_{20}$, especially a C$_{12}$-C$_{18}$, alkyl group, a C$_{16}$ to C$_{18}$ alkenyl group, or a C$_{2-10}$ polyalkylene glycol chain terminated by a C$_{1-4}$alkyl group, for example a polyethylene glycol chain of molecular weight 350 terminated by a methyl group, or a tripropylene glycol chain terminated by a butyl group; each of R$^1$, R$^3$ and R$^4$ also has one of these meanings, especially a C$_{12}$-C$_{18}$ alkyl group; each of R$^7$ and R$^9$ independently represents an ethylene or, especially, methylene, group, and a an b represent 1; R$^8$ represents a cyclohexylene group; and if unit B is present, Y represents a —CH$_2$CH$_2$— or —CH(CH$_3$)CH$_2$— group, and m is from 5 to 20.

In an aspect of the invention, a polymeric polyphosphite is synthesized at least in part using CHDM as an illustrative example is shown in Structure (III).

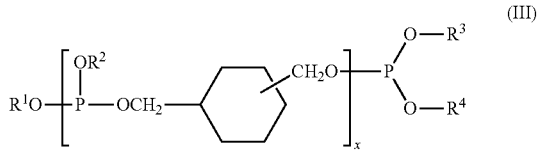

(III)

wherein
- each $R^1$, $R^2$, $R^3$ and $R^4$ can be the same or different and independently selected from the group consisting of $C_{1-20}$ alkyl, $C_{3-22}$ alkenyl, $C_{6-40}$ cycloalkyl, $C_{6-40}$ cycloalkyl, $C_6$ aryl, $C_{6-40}$ arylalkyl, or Y—OH (serving as an end capping moiety) for $R^1$, $R^2$, $R^3$ and $R^4$;
- Y is selected from the group consisting of a $C_{2-40}$ alkylene (e.g., ethylene, propylene), a $C_{2-40}$ cycloaliphatic carboxylic ester (e.g., caprylactone), a $C_{3-40}$ cycloalkylene, a $C_6$ arylene group, and a $C_{6-40}$ aryl alkylene;
- x ranges from 8 to 1,000; further wherein said polymeric polyphosphite is a reaction product of:
- at least one monohydroxy-terminated reactants selected from the group consisting of $R^1$—OH, $R^2$—OH $R^3$—OH and $R^4$—OH; and
- at least one dihydroxy-terminated reactant (e.g.,

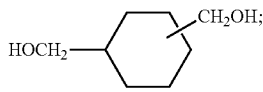

and
a trifunctional reactant comprising at least one phosphorus moiety.

More generically, the polymeric polyphosphites of Structure (III) may be illustrated by Structure (IIIa).

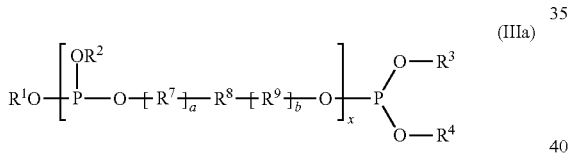

(IIIa)

wherein
- $R^1$, $R^2$, $R^3$ and $R^4$ can be the same or different and independently selected from the group consisting of $C_{1-20}$ alkyl, $C_{3-22}$ alkenyl, $C_{6-40}$ cycloalkyl, $C_{6-40}$ cycloalkyl, $C_6$ aryl, $C_{6-40}$ arylalkyl, or Y—OH (serving as an end capping moiety);
- Y is selected from the group consisting of a $C_{2-40}$ alkylene(e.g., ethylene, propylene), a $C_{2-40}$ cycloaliphatic carboxylic ester (e.g., caprylactone), a $C_{3-40}$ cycloalkylene, a $C_6$ arylene group, and a $C_{6-40}$ aryl alkylene;
- x ranges from 8 to 1,000; further wherein
  - $R^7$ and $R^9$ independently selected from the group consisting of straight and branched $C_{1-6}$ alkylene groups; and
- $R^8$ is selected from the group consisting of $C_{5-10}$ saturated carbocyclic rings;
- a and b are integral values independently selected from the group consisting of 0 and 1; and wherein said polymeric polyphosphite is a reaction product of:
- at least one monohydroxy-terminated reactants selected from the group consisting of $R^1$—OH, $R^2$—OH $R^3$—OH and $R^4$—OH; and
- at least one dihydroxy-terminated reactant is selected from the group HO—$[R^7]_a$—$R^8$—$[R^9]_b$—OH, and
- a trifunctional reactant comprising at least one phosphorus moiety.

Copolymers of polymeric polyphosphites are synthesized at least in part using CHDM as an illustrative example is shown in Structure (IV).

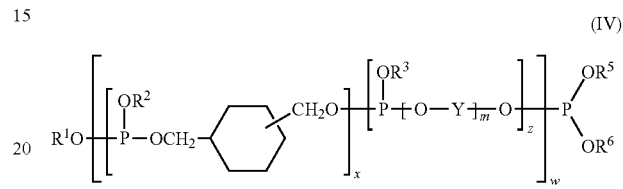

(IV)

wherein
- each $R^1$, $R^2$, $R^3$, $R^4$, $R^5$ and $R^6$ can be the same or different and independently selected from the group consisting of $C_{1-20}$ alkyl, $C_{3-22}$ alkenyl, $C_{6-40}$ cycloalkyl, $C_{6-40}$ cycloalkyl, $C_6$ aryl, $C_{6-40}$ arylalkyl, or Y—OH (serving as an end capping moiety) for $R^1$, $R^2$, $R^3$, $R^4$, $R^5$ and $R^6$;
- Y is selected from the group consisting of a $C_{2-40}$ alkylene(e.g., ethylene, propylene), a $C_{2-40}$ cycloaliphatic carboxylic ester (e.g., caprylactone), a $C_{3-40}$ cycloalkylene, a $C_6$ arylene group, and a $C_{6-40}$ aryl alkylene;
- x ranges from 2 to 1,000;
  - z ranges from 0 to 1,000 with the proviso that when z is greater than 1 but less than or equal to 12, then x ranges from 2 to 1,000, and with the further proviso that when z is 0, then x is 8 or greater;
- m ranges from 1 to 20;
- w ranges from 1 to 1,000; and further wherein said polymeric polyphosphite is a reaction product of:
- at least one monohydroxy-terminated reactants selected from the group consisting of $R^1$—OH, $R^2$—OH $R^3$—OH and $R^4$—OH; and
- at least one dihydroxy-terminated reactant (e.g.,

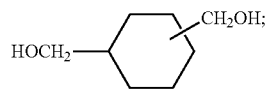

and
a trifunctional reactant comprising at least one phosphorus moiety.

More generically, the diphosphites of Structure (IV) may be illustrated by Structure (IVa).

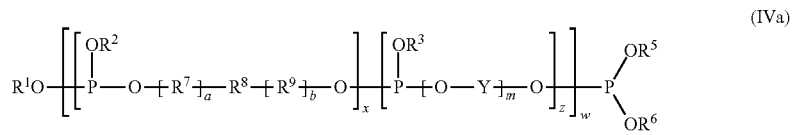

(IVa)

wherein $R^1$, $R^2$, $R^3$, $R^4$, $R^5$ and $R^6$ can be the same or different and independently selected from the group consisting of $C_{1-20}$ alkyl, $C_{3-22}$ alkenyl, $C_{6-40}$ cycloalkyl, $C_{6-40}$ cycloalkyl, $C_6$ aryl, $C_{6-40}$ arylalkyl, or Y—OH (serving as an end capping moiety) for $R^1$, $R^2$, $R^3$, $R^4$, $R^5$ and $R^6$;

Y is selected from the group consisting of a $C_{2-40}$ alkylene (e.g., ethylene, propylene), a $C_{2-40}$ cycloaliphatic carboxylic ester (e.g., caprylactone), a $C_{3-40}$ cycloalkylene, a $C_6$ arylene group, and a $C_{6-4}$ aryl alkylene;

x ranges from 2 to 1,000;

z ranges from 0 to 1,000 with the proviso that when z is greater than 1 but less than or equal to 12, then x ranges from 2 to 1,000, and with the further proviso that when z is 0, then x is 8 or greater;

m ranges from 1 to 20;

w ranges from 1 to 1,000; and further wherein $R^7$ and $R^9$ independently selected from the group consisting of straight and branched $C_{1-6}$ alkylene groups; and $R^8$ is selected from the group consisting of $C_{5-10}$ saturated carbocyclic rings;

a and b are integral values independently selected from the group consisting of 0 and 1; and wherein said polymeric polyphosphite is a reaction product of:

at least one monohydroxy-terminated reactants selected from the group consisting of $R^1$—OH, $R^2$—OH, $R^3$—OH, $R^4$—OH, $R^5$—OH, and $R^6$—OH; and at least one dihydroxy-terminated reactant is selected from the group HO—$[R^7]a$—$R^8$—$[R^9]_b$—OH, and a trifunctional reactant comprising at least one phosphorus moiety.

The polyalkylene glycol units of the copolymeric polyphosphite are often selected from the group consisting of polyethylene glycol and polypropylene glycol.

Preferably the weight average molecular weight of a copolymeric polyphosphite according to the invention is at least 1200 to 100,000 and for a polymeric polyphosphite, preferably in the range of from 6,000 to 100,000.

The polymeric polyphosphite of the invention may be characterised as the reaction product of (i) at least one alcohol $R^2OH$; (ii) at least one diol HO—$[R^7]_a$—$R^8$—$[R^9]_bOH$; (iii) a trifunctional reactant comprising at least one phosphorus moiety; and (iv) if unit B is present, at least one diol H—$[O—Y]_mOH$. Suitably the trifunctional reactant is a triaryl phosphine, especially triphenyl phosphine. Preferred meanings for the various substituents are as given above.

The invention also provides a process for the preparation of a polymeric polyphosphite of the invention, which comprises reacting together in the presence of a base (i) at least one alcohol $R^2OH$; (ii) at least one diol HO—$[R^7]_a$—$R^8$—$[R^9]_bOH$; (iii) a trifunctional reactant comprising at least one phosphorus moiety, especially a triaryl phosphine, preferably triphenyl phosphine; and if unit B is present, (iv) at least one polyalkylene glycol H—$[O—Y]_mOH$; in which $R^2$ is selected from the group consisting of (i) a $C_{1-20}$ alkyl group or $C_{2-22}$ alkenyl group which is optionally interrupted or terminated by a $C_{5-10}$ cycloalkyl or cycloalkenyl group, (ii) a $C_{2-22}$ polyalkylene glycol chain optionally terminated by a $C_{1-4}$ alkyl group, and (iii) a 3 to 7 membered ring containing a —CO—O— group and optionally substituted by a $C_{1-20}$ alkyl group; each of $R^7$ and $R^9$ independently represents a $C_{1-6}$ alkylene group; $R^8$ is selected from the group consisting of $C_{5-10}$ saturated carbocyclic rings; a and b are independently selected from the group consisting of 0 and 1; Y represents a $C_{2-22}$ alkylene group; and m is from 1 to 20.

Synthesis of the compositions typically involve transesterification in which triphenyl phosphite (or any other suitable alkyl or aryl phosphite) is allowed to react with a monoalkyl alcohol or monoalkenyl alcohol or an alkylene glycol ether (e.g., polyethylene glycol ether or polypropylene glycol ether) and at least one diol or polymeric diol $H(OY)_mOH$ wherein Y and m are as hereinafter defined with a suitable base catalyst at temperature between 20° C. and 250° C., and more preferred at temperature between 50° C. and 185° C. The at least one dihydroxy-terminated reactant comprises at least one saturated carbocyclic ring, e.g., cyclohexane dimethanol. Non-limiting examples of monoalkyl alcohols or monoalkenyl alcohols include: decyl, isodecyl, lauryl, tridecyl, isotridecyl, myristyl, pentdecyl, palmyl, stearyl, isotearyl, oleic alcohol, monohydroxyl glycol ethers, etc.

Suitable base catalysts include sodium hydroxide, sodium methoxide, sodium phenolate, potassium hydroxide, and potassium carbonate. The amount of the base catalyst used is within the range of 0.01 to 10 weight percent based on the total amount of reactants charged. In a preferred embodiment, the amounts are within 0.1 to 1.0 weight percent of the reactants.

The mole ratio of alkyl alcohol or glycol-ether and a diol used in forming the phosphites, with regard to triphenyl phosphite, is from about 0.9 to 2.2 moles of the alcohol or glycol ether per mole of triphenyl phosphite and 0.3 to 3.0 mole of the diol per mole of triphenyl phosphite. In a preferred embodiment, the mole ratio is 2.0 to 1.0 of an alkyl or alkenyl alcohol or a glycol ether per mole of triphenyl phosphite and the mole ratio of a diol to triphenyl phosphite is 0.5 to 1.0.

The structure composition of the phosphites depends on the reaction conditions, for example the temperature, the sequence how the reactants are added, alkyl or alkenyl alcohol or glycol ether or a mixture or alkyl or alkenyl alcohol or glycol ether or a combination of some or all are used, the mole ratio and the concentration of the alkyl or alkenyl alcohols or glycol ether and the diols, and the molecular weight of the diols chosen. For example, the phosphorus content of the phosphite can be adjusted by the molecular weight of the diol and the alkyl or alkenyl alcohol or glycol ether chosen.

The preferred alkyl alcohols used are $C_{12}$ to $C_{18}$. The preferred alkenyl alcohols used are the $C_{16}$ and $C_{18}$. The preferred glycol ethers used are Carbowax 350 (monomethylether of polyethylene glycol MW 350, and tripropylene glycol monobutylether.

The polymeric diols used in the process for the copolymers are those which are commercially available, known as poly glycols. The preferred poly glycols are polyethylene or polypropylene glycols, having molecular weight ranging from 200 to 3000, and existing as liquids at room temperature. The most preferred are polyethylene glycols, having molecular weight 300 to 400, and polypropylene glycols, having molecular weight of 300 to 1000.

The organic materials into which the polyphosphites and copolymeric polyphosphites are added, are preferably synthetic polymers. Non-limiting illustrative examples of such polymers include the following.

Polymers of monoolefins and diolefins for example polypropylene, polyisobutylene, polybut-1-ene, poly-4-methylpent-1-ene, polyvinylcyclohexane, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), (VLDPE) and (ULDPE), and blends of the polymers described above, regardless of the method of preparation.

Mixtures of the polymers above, for example, mixtures of polypropylene with polyisobutylene, polypropylene with polyethylene (for example PP/HDPE, PP/LDPE) and mixtures of different types of polyethylene (for example LDPE/HDPE).

Copolymers of monoolefins and diolefins with each other or with other vinyl monomers such as ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, ethylene/vinylcyclohexane copolymers, ethylene/cyclooolefin copolymers (e.g. ethylene/norbornene like COC), ethylene/1-olefins copolymers, where the 1-olefin is generated in-situ; propylene/butadiene copolymers, isobutylene/isoprene copolymers, ethylene/vinylcyclohexane copolymers, ethylene/alkyl acrylate copolymers, ethylene/alkyl methacrylate copolymers, ethylene/vinyl acetate copolymers or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned previously, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

Hydrocarbon resins, (for example $C_5$-$C_9$) including hydrogenated modifications thereof (e.g. tackifiers) and mixtures of polyalkylenes and starch.

Homopolymers and copolymers from the above and which may have any stereostructure including syndiotactic, isotactic, hemi-isotactic or atactic. Stereoblock polymers are also included.

Polystyrene and poly(p-methylstyrene) and poly(α-methylstyene).

Aromatic homopolymers and copolymers derived from vinyl aromatic monomers including styrene, α-methylstyrene, all isomers of vinyl toluene, especially p-vinyltoluene, all isomers of ethyl styrene, propyl styrene, vinyl biphenyl, vinyl naphthalene, and vinyl anthracene, and mixtures thereof. Homopolymers and copolymers may have any stereostructure including syndiotactic, isotactic, hemi-isotactic or atactic. Stereoblock polymers are also included. Copolymers are included, such as vinyl aromatic monomers and comonomers selected from ethylene, propylene, dienes, nitriles, acids, maleic anhydrides, maleimides, vinyl acetate and vinyl chloride or acrylic derivatives and mixtures thereof, for example styrene/butadiene, styrene/acrylonitrile, styrene/ethylene (interpolymers), styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrene/isoprene/styrene, styrene/ethylene/butylene/styrene or styrene/ethylene/propylene/styrene. Hydrogenated aromatic polymers derived from hydrogenation of polymers mentioned above are included, especially including polycyclohexylethylene (PCHE) prepared by hydrogenating atactic polystyrene, often referred to as polyvinylcyclohexane (PVCH). Further included are hydrogenated aromatic polymers derived from hydrogenation of polymers mentioned previously. The homopolymers and copolymers may have any stereostructure including syndiotactic, isotactic, hemi-isotactic or atactic. Stereoblock polymers are also included.

Graft copolymers of vinyl aromatic monomers, such as styrene or α-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed above, for example the copolymer mixtures known as ABS, MBS, ASA or AES polymers.

Halogen-containing polymers such as polychloroprene, chlorinated rubbers, chlorinated and brominated copolymer of isobutylene-isoprene (halobutyl rubber), chlorinated or sulfo-chlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate copolymers. such as styrene on polybutadiene, styrene and alkylacrylates or methacrylates on butadiene, styrene and acrylonitrile on ethylene/propylene/diene terpolymers, styrene and acrylonitrile on polyacrylates or polymethacrylates, styrene and acrylonitrile on acrylate/butadiene copolymers, and copolymer blends known as ABS, MBS, and AES polymers.

Polymers derived from α,β-unsaturated acids and derivatives thereof such as polyacrylates and polymethacrylates; polymethyl methacrylates, polyacrylamides and polyacrylonitriles, impact-modified with butyl acrylate.

Copolymers of the monomers mentioned in the preceding paragraph with each other or with other unsaturated monomers, for example acrylonitrile/butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers.

Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned above.

Homopolymers and copolymers of cyclic ethers such as polyalkylene glycols, polyethylene oxide, polypropylene oxide or copolymers thereof with bisglycidyl ethers.

Polyacetals such as polyoxymethylene and those polyoxymethylenes which contain ethylene oxide as a comonomer; polyacetals modified with thermoplastic polyurethanes, acrylates or MBS.

Polyphenylene oxides and sulfides, and mixtures of polyphenylene oxides with styrene polymers or polyamides.

Polyurethanes derived from hydroxyl-terminated polyethers, polyesters or polybutadienes on the one hand and aliphatic or aromatic polyisocyanates on the other, as well as precursors thereof.

Polyamides and copolyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4,-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyamide systems).

Polyureas, polyimides, polyamide-imides, polyetherimids, polyesterimids, polyhydantoins and polybenzimidazoles.

Polyesters derived from dicarboxylic acids and diols and/or from hydroxycarboxylic acids or the corresponding lactones, for example polyethylene terephthalate, polybutylene terephthalate, poly-1,4-dimethylolcyclohexane terephthalate, polyalkylene naphthalate (PAN) and polyhydroxybenzoates, as well as block copolyether esters derived from hydroxyl-terminated polyethers; and also polyesters modified with polycarbonates or MBS.

Polycarbonates and polyester carbonates.

Polysulfones, polyether sulfones and polyether ketones.

Crosslinked polymers derived from aldehydes on the one hand and phenols, ureas and melamines on the other hand, such as phenol/formaldehyde resins, urea/formaldehyde resins and melamine/formaldehyde resins.

Drying and non-drying alkyd resins.

Unsaturated polyester resins derived from copolyesters of saturated and unsaturated dicarboxylic acids with polyhydric alcohols and vinyl compounds as crosslinking agents, and also halogen-containing modifications thereof of low flammability.

Crosslinkable acrylic resins derived from substituted acrylates, for example epoxy acrylates, urethane acrylates or polyester acrylates.

Alkyd resins, polyester resins and acrylate resins crosslinked with melamine resins, urea resins, isocyanates, isocyanurates, polyisocyanates or epoxy resins.

Crosslinked epoxy resins derived from aliphatic, cycloaliphatic, heterocyclic or aromatic glycidyl compounds, e.g. products of diglycidyl ethers of bisphenol A and bisphenol F, which are crosslinked with customary hardeners such as anhydrides or amines, with or without accelerators.

Natural polymers such as cellulose, rubber, gelatin and chemically modified homologous derivatives thereof, for example cellulose acetates, cellulose propionates and cellulose butyrates, or the cellulose ethers such as methyl cellulose; as well as rosins and their derivatives.

Blends and alloys of the aforementioned polymers (polyblends), for example PP/EPDM, Polyamide/EPDM or ABS, PVC/EVA, PVC/ABS, PVC/MBS, PC/ABS, PC/Polyester, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC.

Naturally occurring and synthetic organic materials which are pure monomeric compounds or mixtures of such compounds, for example mineral oils, animal and vegetable fats, oil and waxes, or oils, fats and waxes based on synthetic esters (e.g. phthalates, adipates, phosphates or trimellitates) and also mixtures of synthetic esters with mineral oils in any weight ratios, typically those used as spinning compositions, as well as aqueous emulsions of such materials.

Aqueous emulsions of natural or synthetic rubber, e.g. natural latex or latices of carboxylated styrene/butadiene copolymers.

In general the polymeric diphosphites and the polymeric polyphosphites of this invention are added to the organic material to be stabilized in amounts from about 0.001 wt % to about 5 wt % of the weight of the organic material to be stabilized. A more preferred range is from about 0.01% to 2.0%. The most preferred range is from 0.025% to 1%.

The stabilizers of this invention may be incorporated into the organic materials at any convenient stage prior to manufacture of the shaped article using techniques known in the art.

The stabilized polymer compositions of the invention may also contain from about 0.001% to 5%, preferably from 0.01% to 2%, and most preferably from 0.025% to 1% of other conventional stabilizers, a non-limiting exemplary list is provided below.

Hindered phenolic antioxidants such as 2,6-di-tert-butyl-4-methylphenol; octadecyl 3,5-di-tert-butyl-4-hydroxy-hydrocinnamate; tetrakis methylene (3,5-di-tert-butyl-4-hydroxyhydrocinnamate)methane; and tris(3,5-di-tert-butyl-4-hydroxybenzyl) isocyanate.

Thioesters, a non-limiting exemplary list including dilauryl thiodipropionate and distearyl thiodipropionate.

Aromatic amine stabilizers, a non-limiting exemplary list including as N,N'-diphenyl-p-phenylene-diamine.

Hindered amine light stabilizers, known as HALS, a non-limiting exemplary list including bis-(2,2,6,6-tetramethylpiperidyl) sebacate, condensation product of N,N'-(2,2,6,6-tetramethylpiperidyl)-hexamethylenediamine and 4,4-octylamino-2,6-dichloro-s-triazine, and the condensation product of N,N'-(2,2,6,6-tetramethylpiperidyl)-hexamethylenediamine and 4-N-morpholinyl-2,6-dichloro-s-triazine.

UV absorbers, a non-limiting exemplary list including 2-hydroxy-4-n-octyloxybenzophenone, 2(2'-hydroxy-5'-methylphenyl)-benzotriazole, and 2(2'-hydroxy-5-t-octylphenyl)-benzotriazole.

Phosphites, a non-limiting exemplary list including tris (2,4-di-tert-butylphenyl)phosphite, distearyl pentaerythritol diphosphite, and 2,4-dicumylphenyl pentaerythritol diphosphite.

Acid neutralizers, a non-limiting exemplary list including calcium stearate, zinc stearate, calcium lactate, calcium stearyl lactate, epoxidized soybean oil, and hydrotalcite (natural and synthetic).

Other additives such as lubricants, antistatic agents, antiblocking agents, slip agents, fire retardants, nucleating agents, impact modifiers, blowing agents, plasticizers, fillers, dyes, and pigments may be used in an amount appropriate and in combination of the invented polymeric diphosphites to modify a selected property of the polymer, such as alkanolamines, a non-limiting exemplary list including triethanolamine and triisopropanolamine.

The novel phosphites can be used in particular with combination of phenolic antioxidants, light stabilizers and/ or processing stabilizers. In addition the phosphite compositions can comprise further additives, such as for example any of the following:

Antioxidants:

Alkylated monophenols, for example 2,6-di-tert-butyl-4-methylphenol, 2-tert-butyl-4,6-di-methylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example 2,6-di-nonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol and mixtures thereof.

Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

Hydroquinones and alkylated hydroquinones, for example 2,6-di-tert-butyl-4-methoxy-phenol, 2,5-di-tert-butylhydroquinone, 2,5-di-tert-amylhydroquinone, 2,6-diphenyl-4-octade-cyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl) adipate.

Tocopherols, for example α-tocopherol, β-tocopherol, γ-tocopherol, δ-tocopherol and mixtures thereof (vitamin E).

Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl)-disulfide.

Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)-phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butyl-phenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl)butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis(3,5-di-tert-butyl-4-hydroxyphenyl)propane, 2,2-bis-(5-tert-butyl-4-hydroxy2-methylphenyl)-4-n-dodecylmercaptobutane, 1,1,5,5-tetra(5-tert-butyl-4-hydroxy-2-methylphenyl)pentane.

O-, N- and S-benzyl compounds, for example 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzylmercaptoacetate.

Hydroxybenzylated malonates, for example dioctadecyl-2,2-bis(3,5-di-tert-butyl-2-hydroxybenzyl)malonate, di-octadecyl-2-(3-tert-butyl-4-hydroxy-5-methylbenzyl)malonate, di-dodecylmercaptoethyl-2,2-bis(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl) malonate.

Aromatic hydroxybenzyl compounds, for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

Triazine compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl) isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.

Benzylphosphonates, for example dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

Acylaminophenols, for example 4-hydroxylauranilide, 4-hydroxystearanilide, octyl N-(3,5-di-tert-butyl-4-hydroxyphenyl)carbamate.

Esters of β-(3,5-di-tert-butyl-4-hvdroxyphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

Esters of β-(5-tert-butyl-4-hvdroxy-3-methylphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane; 3,9-bis[2-{3-(3-tert-butyl-4-hydroxy-5-methylphenyl)propionyloxy}-1,1-dimethylethyl]-2,4,8,10-tetraoxaspiro[5.5]undecane.

Esters of β-(3,5-dicyclohexyl-4-hydroxyphenyl)propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

Esters of 3,5-di-tert-butyl-4-hvdroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

Amides of β-(3,5-di-tert-butyl-4-hydroxyphenyl)propionic acid e.g. N,N'-bis(3,5-di-tert-butyl-4-hydroxyphenylpropionyl)hexamethylenediamide, N,N'-bis(3,5-di-tert-butyl-4-hydroxy-phenylpropionyl)trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl]oxamide.

Ascorbic Acid (Vitamin C).

Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octylphenothiazines, N-allylphenothiazine, N,N,N',N'-tetraphenyl-1,4-diaminobut-2-ene, N,N-bis(2,2,6,6-tetramethylpiperid-4-yl-hexamethylenediamine, bis(2,2,6,6-tetramethylpiperid-4-yl)sebacate, 2,2,6,6-tetramethylpiperidin-4-one, 2,2,6,6-tetramethylpiperidin-4-ol.

UV Absorbers and Light Stabilizers 2-(2'-HydroxyphenyObenzotriazoles, for example 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis (α,α-dimethylbenzyl)-2'-hydroxyphenyl)benzotriazole, 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyloxy)carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl) benzotriazole, 2-(3'-dodecyl-2'-hydroxy-5'-methylphenyl) benzotriazole, 2-(3'-tert-butyl-2'-hydroxy-5'-(2-isooctyloxycarbonylethyl)phenylbenzotriazole, 2,2'-methylenebis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300; —[R—CH$_2$CH$_2$—COO—CH$_2$CH$_2$]$_2$—, where R=3'-tert-butyl-4'-hydroxy-5'-2H-benzotriazol-2-ylphenyl, 2-[2'-hydroxy-3'-(α,α-dimethylbenzyl)-5'-(1,1,3,3-tetramethylbutyl)phenyl]-benzotriazole; 2-[2'-hydroxy-3'-(1,1,3,3-tetramethylbutyl)-5'-(α,α-dimethylbenzyl)phenyl]benzotriazole.

2-Hvdroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

Esters of substituted and unsubstituted benzoic acids, for example 4-tert-butylphenyl salicylate, phenyl salicylate, octylphenyl salicylate, dibenzoyl resorcinol, bis(4-tert-butylbenzoyl)resorcinol, benzoyl resorcinol, 2,4-di-tert-butylphenyl, 3,5-di-tert-butyl-4-hydroxybenzoate, hexadecyl-3,5-di-tert-butyl-4-hydroxybenzoate, octadecyl-3,5-di-tert-butyl-4-hydroxybenzoate, 2-methyl-4,6-di-tert-butylphenyl-3,5-di-tert-butyl-4-hydroxybenzoate.

Acrylates, for example ethyl α-cyano-β,β-diphenylacrylate, isooctyl-α-cyano-β,β-diphenylacrylate, methyl α-carbomethoxycinnamate, methyl α-cyano-β-methyl-p-methoxycinnamate, butyl α-cyano-β-methyl-p-methoxycinnamate, methyl α-carbomethoxy-p-methoxycinnamate and N-(β-carbomethoxy β-cyanovinyl)-2-methylindoline.

Nickel compounds, for example nickel complexes of 2,2'-thiobis[4-(1,1,3,3-tetramethyl-butyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenylundecylketoxime, nickel complexes of 1-phenyl-4-lauroyl-5-hydroxypyrazole, with or without additional ligands.

Stericallv hindered amines, for example bis(2,2,6,6-tetramethyl-4-piperidyl)sebacate, bis(2,2,6,6-tetramethyl-4-piperidyl)succinate, bis(1,2,2,6,6-pentamethyl-4-piperidyl) sebacate, bis(1-octyloxy-2,2,6,6-tetramethyl-4-piperidyl) sebacate, bis(1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tert-octylamino-2,6-dichloro-1,3,5-triazine, tris (2,2,6,6-tetramethyl-4-piperidyl)nitrilotriacetate, tetrakis(2,2,6,6-tetramethyl-4-piperidyl)-1,2,3,4- butanetetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decane-2,4-dione, bis(1-octyloxy-2,2,6,6-tetramethylpiperidyl)sebacate, bis(1-octyloxy-2,2,6,6-tetramethylpiperidyl)succinate, linear or cyclic condensates of N,N'-bis(2,2,6,6-tetramethyl-4-piperidyl)hexamethylene diamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl)pyrrolidine-2,5-dione, a mixture of 4-hexadecyloxy- and 4-stearyloxy-2,2,6,6-tetramethylpiperidine, a condensate of N,N'-bis(2,2,6,6-tetramethyl-4-piperidyl)hexamethylenediamine and 4-cyclohexylamino-2,6-dichloro-1,3,5-triazine, a condensate of 1,2-bis(3-aminopropylamino)ethane and 2,4,6-trichloro-1,3,5-triazine as well as 4-butylamino-2,2,6,6-tetramethylpiperidine, a condensate of 1,6-hexanediamine and 2,4,6-trichloro-1,3,5-triazine as well as N,N-dibutylamine and 4-butylamino-2,2,6,6-tetramethylpiperidine, N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-di-aza-4-oxo-spiro[4,5]decane, a reaction product of 7,7,9,9-tetramethyl-2-cycloundecyl-1-oxa-3,8-diaza-4-oxospiro-[4,5]decane and epichlorohydrin, 1,1-bis(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl)hexamethylenediamine, a diester of 4-methoxymethylenemalonic acid with 1,2,2,6,6-pentamethyl-4-hydroxypiperidine, poly[methylpropyl-3-oxy-4-(2,2,6,6-tetramethyl-4-piperidyl)]siloxane, a reaction product of maleic acid anhydride-α-olefin copolymer with 2,2,6,6-tetramethyl-4-aminopiperidine or 1,2,2,6,6-pentamethyl-4-aminopiperidine.

Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of n- and p-ethoxy-disubstituted oxanilides.

2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)phenyl]-4,6-bis(2,4-dimethyl)-1,3,5-triazine, 2-[2-hydroxy-4-(2-hydroxy-3-octyloxypropyloxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethyl-phenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine, 2-[2-hydroxy-4-(2-ethylethoxy)phenyl]-4,6-diphenyl-1,3,5-triazine.

Metal deactivators, for example N,N'-diphenyloxamide, N-salicylal-N'-salicyloyl hydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl)oxalyldihydrazide, N,N'-bis(salicyloyl)thiopropionyl dihydrazide.

Phosphites and phosphonites, for example triphenyl phosphite, diphenylalkyl phosphites, phenyldialkyl phosphites, tris(nonylphenyl)phosphite, trilauryl phosphite, trioctadecyl phosphite, distearylpentaerythritol diphosphite, tris(2,4-di-tert-butylphenyl)phosphite, diisodecyl pentaerythritol diphosphite, bis(2,4-di-tert-butylphenyl)pentaerythritol diphosphite, bis(2,4-di-cumylphenyl)pentaerythritol diphosphite, bis(2,6-di-tert-butyl-4-methylphenyl)pentaerythritol diphosphite, diisodecyloxypentaerythritol diphosphite, bis(2,4-di-tert-butyl-6-methylphenyl)-pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]-1,3,2-dioxaphosphocin, bis(2,4-di-tert-butyl-6-methylphenyl) methyl phosphite, bis(2,4-di-tert-butyl-6-methylphenyl) ethyl phosphite, 6-fluoro-2,4,8,10-tetra-tert-butyl-12-methyl-dibenz[d,g]-1,3,2-dioxaphosphocin, 2,2',2''-nitrilo-[triethyltris(3,3',5,5'-tetra-tert-butyl-1,r-bi[rho]henyl-2,2'-diyl)phosphite], 2-ethylhexyl(3,3',5,5'-tetra-tert-butyl-1,1'-biphenyl-2,2'-diyl)phosphite, 5-butyl-5-ethyl-2-(2,4,6-tri-tert-butylphenoxy)-1,3,2-dioxaphosphirane.

Phosphines, for example 1,3-bis(diphenylphosphino)-2,2-dimethyl-propane.

Hydroxylamines, for example N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

Nitrones, for example N-benzyl-α-phenylnitrone, N-ethyl-α-methylnitrone, N-octyl-α-heptylnitrone, N-lauryl-α-undecylnitrone, N-tetradecyl-α-tridecylnitrone, N-hexadecyl-α-pentadecylnitrone, N-octadecyl-α-heptadecylnitrone, N-hexadecyl-α-heptadecylnitrone, N-ocatadecyl-a-pentadecylnitrone, N-heptadecyl-α-hepta-decylnitrone, N-octadecyl-α-hexadecylnitrone, nitrone derived from N,N-dialkylhydroxylamine derived from hydrogenated tallow amine.

Thiosynerqists, for example dilauryl thiodipropionate or distearyl thiodipropionate.

Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.

Polyamide stabilizers, for example copper salts in combination with iodides and/or phosphorus compounds and salts of divalent manganese.

Basic co-stabilizers, for example melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example calcium stearate, zinc stearate, magnesium behenate, magnesium stearate, sodium ricinoleate and potassium palmitate, antimony pyrocatecholate or zinc pyrocatecholate.

Nucleating agents, for example inorganic substances, such as talcum, metal oxides, such as titanium dioxide or magnesium oxide, phosphates, carbonates or sulfates of, preferably, alkaline earth metals; organic compounds, such as mono- or polycarboxylic acids and the salts thereof, e.g. 4-tert-butylbenzoic acid, adipic acid, diphenylacetic acid, sodium succinate or sodium benzoate; polymeric compounds, such as ionic copolymers (ionomers), e.g., 1,3:2,4-bis(3',4'-dimethylbenzylidene)sorbitol, 1,3:2,4-di(paramethyldibenzylidene)sorbitol, and 1,3:2,4-di(benzylidene)sorbitol.

Fillers and reinforcing agents, for example calcium carbonate, silicates, glass fibres, glass bulbs, asbestos, talc, kaolin, mica, barium sulfate, metal oxides and hydroxides, carbon black, graphite, wood flour and flours or fibers of other natural products, synthetic fibers.

Other additives, for example plasticizers, lubricants, emulsifiers, pigments, rheology additives, catalysts, flow-control agents, optical brighteners, flameproofing agents, antistatic agents blowing agents and infrared (IR) adsorbers. Preferred IR absorbers are for example pigments, dyes or organometallic compounds.

Benzofuranones and indolinones, such as 3-[4-(2-acetoxyethoxy)phenyl]-5,7-di-tert-butylbenzofuran-2-one, 5,7-di-tert-butyl-3-[4-(2-stearoyl-oxyethoxy)phenyl]benzofuran-2-one, 3,3'-bis[5,7-di-tert-butyl-3-(4-[2-hydroxyethoxy]phenyl)-benzofuran-2-one], 5,7-di-tert-butyl-3-(4-ethoxyphenyl)benzofuran-2-one, 3-(4-acetoxy-3,5-dimethylphenyl)-5,7-di-tert-butylbenzofuran-2-one, 3-(3,5-dimethyl-4-pivaloyloxyphenyl)-5,7-di-tert-butylbenzofuran-2-one, 3-(3,4-dimethylphenyl)-5,7-di-tert-butylbenzofuran-2-one, 3-(2,3-dimethylphenyl)-5,7-di-tert-butylbenzofuran-2-one or 3-(2-acetyl-5-isooctylphenyl)-5-isooctylbenzofuran-2-one.

The synthetic polymers prepared in this way can be employed in a wide variety of forms, for example as foams, films, fibers, tapes, molding compositions, as profiles or as binders for coating materials, especially powder coatings, adhesives, putties or especially as thick-layer polyolefin moldings which are in long-term contact with extractive media, such as, for example, pipes for liquids or gases, films, fibers, geomembranes, tapes, profiles or tanks.

In one non-limiting embodiment, the preferred thick-layer polyolefin moldings have a layer thickness of from 1 to 50 mm, in particular from 1 to 30 mm, for example from 2 to 10 mm.

The compositions according to the invention can be advantageously used for the preparation of various shaped articles. An exemplary non-limiting list of end-use applications include, but are not limited to: Floating devices, marine applications, pontoons, buoys, plastic lumber for decks, piers, boats, kayaks, oars, and beach reinforcements; Automotive applications, in particular bumpers, dashboards, battery, rear and front linings, moldings parts under the hood, hat shelf, trunk linings, interior linings, air bag covers, electronic moldings for fittings (lights), panes for dashboards, headlamp glass, instrument panel, exterior linings, upholstery, automotive lights, head lights, parking lights, rear lights, stop lights, interior and exterior trims; door panels; gas tank; glazing front side; rear windows; seat backing, exterior panels, wire insulation, profile extrusion for sealing, cladding, pillar covers, chassis parts, exhaust systems, fuel filter/filler, fuel pumps, fuel tank, body side moldings, convertible tops, exterior mirrors, exterior trim, fasteners/fixings, front end module, glass, hinges, lock systems, luggage/roof racks, pressed/stamped parts, seals, side impact protection, sound deadener/insulator and sunroof; Road traffic devices, in particular sign postings, posts for road marking, car accessories, warning triangles, medical cases, helmets, tires; Devices for plane, railway, motor car (car, motorbike) including furnishings; Devices for space applications, in particular rockets and satellites, e.g. reentry shields; Devices for architecture and design, mining applications, acoustic quietized systems, street refuges, and shelters.

The invention also has applicability in: Appliances, cases and coverings in general and electric/electronic devices (personal computer, telephone, portable phone, printer, television-sets, audio and video devices), flower pots, satellite TV bowl, and panel devices; Jacketing for other materials such as steel or textiles; Devices for the electronic industry, in particular insulation for plugs, especially computer plugs, cases for electric and electronic parts, printed boards, and materials for electronic data storage such as chips, check cards or credit cards; Electric appliances, in particular washing machines, tumblers, ovens (microwave oven), dishwashers, mixers, and irons; Covers for lights (e.g. streetlights, lamp-shades); Applications in wire and cable (semiconductor, insulation and cable-jacketing); and foils for condensers, refrigerators, heating devices, air conditioners, encapsulating of electronics, semi-conductors, coffee machines, and vacuum cleaners.

The invention further has applicability in: Technical articles such as cogwheel (gear), slide fittings, spacers, screws, bolts, handles, and knobs; Rotor blades, ventilators and windmill vanes, solar devices, swimming pools, swimming pool covers, pool liners, pond liners, closets, wardrobes, dividing walls, slat walls, folding walls, roofs, shutters (e.g. roller shutters), fittings, connections between pipes, sleeves, and conveyor belts; Sanitary articles, in particular shower cubicles, lavatory seats, covers, and sinks; Hygienic articles, in particular diapers (babies, adult incontinence), feminine hygiene articles, shower curtains, brushes, mats, tubs, mobile toilets, tooth brushes, and bed pans; Pipes (crosslinked or not) for water, waste water and chemicals, pipes for wire and cable protection, pipes for gas, oil and sewage, guttering, down pipes, and drainage systems; Profiles of any geometry (window panes) and siding; Glass substitutes, in particular extruded or co-extruded plates, glazing for buildings (monolithic, twin or multiwall), aircraft, schools, extruded sheets, window film for architectural glazing, train, transportation, sanitary articles, and greenhouse; Plates (walls, cutting board), extrusion-coating (photographic paper, tetrapack and pipe coating), silos, wood substitute, plastic lumber, wood composites, walls, surfaces, furniture, decorative foil, floor coverings (interior and exterior applications), flooring, duck boards, and tiles; Intake and outlet manifolds; and Cement-, concrete-, composite-applications and covers, siding and cladding, hand rails, banisters, kitchen work tops, roofing, roofing sheets, tiles, and tarpaulins.

Still further applications include: Plates (walls and cutting board), trays, artificial grass, astroturf, artificial covering for stadium rings (athletics), artificial floor for stadium rings (athletics), and tapes; Woven fabrics continuous and staple, fibers (carpets/hygienic articles/geotextiles/monofilaments; filters; wipes/curtains (shades)/medical applications), bulk fibers (applications such as gown/protection clothes), nets, ropes, cables, strings, cords, threads, safety seat-belts, clothes, underwear, gloves; boots; rubber boots, intimate apparel, garments, swimwear, sportswear, umbrellas (parasol, sunshade), parachutes, paraglides, sails, "balloon-silk", camping articles, tents, airbeds, sun beds, bulk bags, and bags; and Membranes, insulation, covers and seals for roofs, tunnels, dumps, ponds, dumps, walls roofing membranes, geomembranes, swimming pools, curtains (shades)/sun-shields, awnings, canopies, wallpaper, food packing and wrapping (flexible and solid), medical packaging (flexible & solid), airbags/safety belts, arm- and head rests, carpets, centre console, dashboard, cockpits, door, overhead console module, door trim, headliners, interior lighting, interior mirrors, parcel shelf, rear luggage cover, seats, steering column, steering wheel, textiles, and trunk trim.

Additional applications include: Films (packaging, dump, laminating, agriculture and horticulture, greenhouse, mulch, tunnel, silage), bale wrap, swimming pools, waste bags, wallpaper, stretch film, raffia, desalination film, batteries, and connectors; Food packing and wrapping (flexible and solid), bottles; Storage systems such as boxes (crates), luggage, chest, household boxes, pallets, shelves, tracks, screw boxes, packs, and cans; and Cartridges, syringes, medical applications, containers for any transportation, waste baskets and waste bins, waste bags, bins, dust bins, bin liners, wheely bins, container in general, tanks for water/used water/chemistry/gas/oil/gasoline/diesel; tank liners, boxes, crates, battery cases, troughs, medical devices such as piston, ophthalmic applications, diagnostic devices, and packing for pharmaceuticals blister.

Still additional applications may encompass: Extrusion coating (photo paper, tetrapack, pipe coating), household articles of any kind (e.g. appliances, thermos bottle/clothes hanger), fastening systems such as plugs, wire and cable clamps, zippers, closures, locks, and snap-closures; Support devices, articles for the leisure time such as sports and fitness devices, gymnastics mats, ski-boots, inline-skates, skis, big foot, athletic surfaces (e.g. tennis grounds); screw tops, tops and stoppers for bottles, and cans; Furniture in general, foamed articles (cushions, impact absorbers), foams, sponges, dish clothes, mats, garden chairs, stadium seats, tables, couches, toys, building kits (boards/figures/balls), playhouses, slides, and play vehicles; Materials for optical and magnetic data storage; Kitchen ware (eating, drinking, cooking, storing); Boxes for CD's, cassettes and video tapes; DVD electronic articles, office supplies of any kind (ball-point pens, stamps and ink-pads, mouse, shelves, tracks), bottles of any volume and content (drinks, detergents, cosmetics including perfumes), and adhesive tapes; Footwear (shoes/shoe-soles), insoles, spats, adhesives, structural adhesives, food boxes (fruit, vegetables, meat, fish), synthetic paper, labels for bottles, couches, artificial joints (human), printing plates (flexographic), printed circuit boards, and display technologies; and devices of filled polymers (talc, chalk, china clay (kaolin), wollastonite, pigments, carbon black, TiO2, mica, nanocomposites, dolomite, silicates, glass, asbestos).

Still further applications may encompass are: compositions comprising as component (a) fibers and fabrics used in nonwoven medical fabric and related apparel (surgical gowns, drapes, bandages), construction fabrics (house wrapping, roofing, swimming-pool wrapping) and home furnishing (carpets, table linens, shower curtains).

Thus, a further embodiment of the present invention relates to a shaped article, in particular a film, pipe, profile, bottle, tank or container, fiber containing a composition as described above.

As evident from the above, the organic materials to be protected are preferably organic polymers, particularly synthetic polymers. Thermoplastic materials, in particular polyolefins, are particularly advantageously protected. In particular, the excellent effectiveness of the polymeric compounds of the phosphites as processing stabilizers (heat stabilizers) should be emphasized. For this purpose, they are advantageously added to the polymer before or during processing thereof. However, other polymers (for example elastomers) or lubricants or hydraulic fluids can also be stabilized against degradation, for example light-induced or thermo-oxidative degradation. Elastomers are given in the above list of possible organic materials.

The invention will now be described by a series of examples.

EXAMPLE #1

To a three-neck 5000 mL flask equipped with a magnetic stirrer, a distillation column connected to a receiver and a vacuum system was added 778 grams (5.4 mol) of cyclohexane dimethanol, triphenyl phosphite (1775 g, 5.7 mol), stearyl alcohol (1806 g, 6.67 mol), and 0.3 grams of potassium hydroxide. The mixture was mixed well and heated to approximately 150° C. under nitrogen and held at the temperature for 1 hour. The pressure was then gradually reduced to 0.3 mm Hg and the temperature was increased to 180° C. over a course of 1 hour. The reaction contents were held at 180° C. under the vacuum for 2 hours at which point no more phenol was distilling out. The vacuum was then broken by nitrogen and the crude product was cooled to ambient temperature. The product was a soft solid with a melting point of around 30° C.

EXAMPLE #2

The apparatus in Example #1 was used. 100 grams (0.69 mol) of cyclohexane dimethanol, triphenyl phosphite (237 g, 0.76 mol), a mixture of lauryl and myristyl alcohol with a hydroxyl number of about 280, (190 g, 0.95 mol), and 0.4 grams of potassium hydroxide were added. The mixture was mixed well and heated to approximately 150° C. under nitrogen and held at the temperature for 1 hour. The pressure was then gradually reduced to 0.3 mm Hg and the temperature was increased to 180° C. over a course of 1 hour. The reaction contents were held at 180° C. under the vacuum for 2 hours at which point no more phenol was distilling out. The vacuum was then broken by nitrogen and the crude product was cooled to ambient temperature. The product was a non-viscous liquid.

EXAMPLE #3

The apparatus in Example #1 was used. 65 grams (0.45 mol) of cyclohexane dimethanol, triphenyl phosphite (189 g, 0.61 mol), a mixture of lauryl and myristyl alcohol with a hydroxyl number of about 280, (166 g, 0.85 mol), polypropylene glycol with an average molecular weight of 400 (25 g, 0.063 mol), and 0.4 grams of potassium hydroxide were added. The mixture was mixed well and heated to approximately 150° C. under nitrogen and held at the temperature for 1 hour. The pressure was then gradually reduced to 0.3 mm Hg and the temperature was increased to 180° C. over a course of 1 hour. The reaction contents were held at 180° C. under the vacuum for 2 hours at which point no more phenol was distilling out. The vacuum was then broken by nitrogen and the crude product was cooled to ambient temperature. The product was a non-viscous liquid.

EXAMPLE #4

The apparatus in Example #1 was used. 20 grams (0.14 mol) of cyclohexane dimethanol, 7 g polypropylene glycol 400 (0.02 m) triphenyl phosphite (100 g, 0.32 mol), stearyl alcohol (188 g, 0.70 mol) and 0.4 grams of potassium hydroxide were added. The mixture was mixed well and heated to approximately 150 C under nitrogen and held at the temperature for 1 hour. The pressure was then gradually reduced to 0.3 mm Hg and the temperature was increased to 180° C. over a course of 1 hour. The reaction contents were held at 180° C. under the vacuum for 2 hours at which point no more phenol was distilling out. The vacuum was then broken by nitrogen and the crude product was cooled to ambient temperature. The product was a solid.

EXAMPLE #5

The apparatus in Example #1 was used. 20 grams (0.14 mol) of cyclohexane dimethanol, 7 g polypropylene glycol 400 (0.02 m), triphenyl phosphite (100 g, 0.32 mol), a mixture of lauryl and myristyl alcohol with a hydroxyl number of about 280 (136 g, 0.69 mol) and 0.4 grams of potassium hydroxide were added. The mixture was mixed well and heated to approximately 150 C under nitrogen and held at the temperature for 1 hour. The pressure was then gradually reduced to 0.3 mm Hg and the temperature was increased to 180° C. over a course of 1 hour. The reaction contents were held at 180° C. under the vacuum for 2 hours at which point no more phenol was distilling out. The vacuum was then broken by nitrogen and the crude product was cooled to ambient temperature. The product was a non-viscous liquid.

EXAMPLE #6

The apparatus in Example #1 was used. 38 grams (0.26 mol) of cyclohexane dimethanol, triphenyl phosphite (200 g, 0.65 mol), a mixture of lauryl and myristyl alcohol with a hydroxyl number of about 196, (183 g, 0.93 mol), polyethylene glycol with an average molecular weight of 300 (84 g, 0.28 mol), and 0.4 grams of potassium hydroxide were added. The mixture was mixed well and heated to approximately 160° C. The pressure was then gradually reduced to 0.3 mm Hg and the temperature was increased to 180° C. over the course of 1 hour. The reaction contents were held at 180° C. under the vacuum for 2 hours at which point no more phenol was distilling out. The vacuum was then broken by nitrogen and the crude product was cooled to ambient temperature. The product was a viscous liquid.

EXAMPLE #7

The apparatus in Example #1 was used. 38 grams (0.29 mol) of cyclohexane dimethanol, triphenyl phosphite (200 g, 0.64 mol), a mixture of lauryl and myristyl alcohol (183 g, 0.93 mol) polypropylene glycol 400 (110, 0.28) and 0.4 grams of potassium hydroxide were added. The mixture was mixed well and heated to approximately 150° C. under nitrogen and held at the temperature for 1 hour. The pressure was then gradually reduced to 0.3 mm Hg and the temperature was increased to 180° C. over a course of 1 hour. The reaction contents were held at 180° C. under the vacuum for 2 hours at which point no more phenol was distilling out. The vacuum was then broken by nitrogen and the crude product was cooled to ambient temperature. The product was a non-viscous liquid.

COMPARATIVE EXAMPLE #8 (Non-CHDM Polyphosphite)

The apparatus in Example #1 was used. PPG 400 (95 g, 0.237 mol), triphenyl phosphite (73 g, 0.235 mol), a mixture of lauryl and myristyl alcohol with a hydroxyl number of about 280, (47 g, 0.235 mol), and 0.8 grams of potassium hydroxide were added. The mixture was mixed well and heated to 160-162° C. under nitrogen and held at the temperature for 1 hour. The pressure was then gradually reduced to 0.3 mmHg and the temperature was increased to 170-172° C. over a course of 1 hour. The reaction contents were held at 170-172° C. under the vacuum for 2 hours at which point no more phenol was distilling out. The vacuum was then broken by nitrogen and the crude product was cooled to 50° C. The product was a clear, colorless liquid.

COMPARATIVE EXAMPLE #9 (Non-CHDM Polyphosphite)

The apparatus in Example #1 was used. PPG 400 (100 g, 0.25 mol), triphenyl phosphite (155 g, 0.5 mol), a mixture of lauryl and myristyl alcohol with a hydroxyl number of about 280, (200 g, 1.0 mol), and 0.8 grams of potassium hydroxide were added. The mixture was mixed well and heated to 160-162° C. under nitrogen and held at the temperature for 1 hour. The pressure was then gradually reduced to 0.3 mmHg and the temperature was increased to 170-172° C. over a course of 1 hour. The reaction contents were held at 170-172° C. under the vacuum for 2 hours at which point no more phenol was distilling out. The vacuum was then broken by nitrogen and the crude product was cooled to 50° C. The product was a clear, colorless liquid.

Characteristics of the various synthesized additives may be characterized at least in part by the following tables.

TABLE 1

| Example | #1 | #2 | #3 | #4 | #5 | #6 | #7 | Comp. #8 | Comp. #9 |
| --- | --- | --- | --- | --- | --- | --- | --- | --- | --- |
| MP ° C. | 35° C. | liq. | liq. | 40° C. | liq. | liq. | liq. | liq. | liq. |
| AV (acid value) | 0.01 | 0.01 | 0.01 | 0.01 | 0.01 | 0.01 | 0.01 | 0.01 | 0.01 |
| % P | 6.4 | 7.6 | 6.9 | 4.5 | 6.0 | 5.7 | 5.7 | 4.9 | 4.9 |
| Avg. $MW_w$ | 59,077 | 13,957 | 11,009 | 1846 | 1,651 | 9,320 | 8,104 | 9,111 | 2,550 |

The solid phosphites of the invention can be blended with higher melting point materials to increase the melting point of the phosphites. The phosphite from Example #1 was used for all of the examples below.

TABLE 2

|  | A | B | C | D |
|---|---|---|---|---|
| Ex. #1 phosphite | 40% | 50% | 50% | 50% |
| Ca stearate | 30% |  | 25% | 20% |
| Zn stearate | 30% |  | 25% | 20% |
| Pentaerythritol tetrastearate |  | 50% |  |  |
| Mg stearate |  |  |  | 10% |
| MP (° C.) | 98 | 62 | 88 | 81 |

EXAMPLE #10

A comparative study (see Table 3) measuring the performance of CHDM phosphites against a standard phosphite, DOVERPHOS® 6 (triisodecyl phosphite), was performed in PVC. All of the formulations were compounded on a two roll mill at 180° C. for 3 min. The resulting sheets were then cut into strips and placed into a Mathis oven at 180 C. The time it took for the PVC to char for each was measured. The CHDM phosphites all imparted greater thermal stability to the PVC then the DOVERPHOS® 6. In the same study a comparison was made between phosphites (or polyphosphites) with cycloaliphatic diols and those without. Table 3 results show that all polyphosphites with cycloaliphatic diol (CHDM) perform better than those without CHDM.

TABLE 3

|  | A | B | C | D | E |
|---|---|---|---|---|---|
| OxyVinyl ®240 | 100 | 100 | 100 | 100 | 100 |
| DINP (diisononyl phthalate) | 55 | 55 | 55 | 55 | 55 |
| ESO (epoxy oil) | 3 | 3 | 3 | 3 | 3 |
| ZnSt (zinc stearate) | 0.25 | 0.25 | 0.25 | 0.25 | 0.25 |
| BBP (benzyl butyl phthalate) | 5 | 5 | 5 | 5 | 5 |
| DOVERPHOS ® 6 (triisodecyl phosphite) | 3 |  |  |  |  |
| Ex. #1 CHDM poly phosphite |  | 3 |  |  |  |
| Ex. #5 CHDM copoly phosphite |  |  | 3 |  |  |
| Ex. #8 poly phosphite (no CHDM) |  |  |  | 3 |  |
| Ex. #9 polyphosphite (no CHDM) |  |  |  |  | 3 |
| Char time (min) @ 180° C. | 80 | 100 | 120 | 85 | 95 |

EXAMPLE #11

A further comparison was made between phosphites with cycloaliphatic diols and those without. The following formulations were tested.

TABLE 4

| Polypropylene | 99.82% | 99.82% |
|---|---|---|
| DOVERNOX ® 76 (octadecyl 3,5-di-t-butyl-4-hydroxyhydrocinnamate) | 0.030% | 0.030% |
| Ex. #5 CHDM copoly phosphite phosphite | 0.15% |  |
| Comparative Ex. #8 poly-phosphite (No CHDM) |  | 0.15% |

TABLE 4-continued

| MFI extrusion @ 260° C. | | |
|---|---|---|
| $1^{st}$ pass | 18 | 18 |
| $3^{rd}$ pass | 22 | 24 |
| $5^{th}$ pass | 28 | 40 |
| YI extrusion @ 260° C. | | |
| $1^{st}$ pass | 6 | 7 |
| $3^{rd}$ pass | 8 | 9 |
| $5^{th}$ pass | 10 | 11 |

As illustrated in Table 4, the cycloaliphatic polyphosphite performed better in extrusion stability as measured by melt flow index and yellowness index in polypropylene.

A still further comparison was made between phosphites with cycloaliphatic diols and those without. The following formulations were tested.

TABLE 5

| Polypropylene | 99.835% | 99.825% | 99.8% |
|---|---|---|---|
| DOVERNOX ® 10 (Tetrakis methylene(3,5-di-t-butyl-4-hydroxyhydrocinnamate)methane) | 0.05% | 0.05% | 0.05% |
| CaSt (calcium stearate) | 0.05% | 0.05% | 0.05% |
| Ex. #5 CHDM co poly phosphite | 0.065% |  |  |
| Comparative Ex. #8 phosphite no CHDM |  | 0.075% |  |
| Comparative Ex. #8 phosphite no CHDM |  |  | 0.1% |
| MFI extrusion @ 260° C. | | | |
| $1^{st}$ pass | 18.5 | 18.6 | 18.5 |
| $3^{rd}$ pass | 21 | 27 | 23 |
| $5^{th}$ pass | 39 | 47 | 41 |
| YI extrusion @ 260° C. | | | |
| $1^{st}$ pass | 6 | 6 | 6 |
| $3^{rd}$ pass | 10 | 11 | 8 |
| $5^{th}$ pass | 12.5 | 14 | 12 |

As illustrated in Table 5, the cycloaliphatic diol-based polyphosphite performed better in extrusion stability as measured by melt flow index and yellowness index in polypropylene, even at lower concentrations than a non-saturated aliphatic diol phosphite.

A still further comparison was made between polyphosphites with cycloaliphatic diols and those without. The following formulations were tested.

TABLE 6

| High Density Polyethylene | 99.86% | 99.85% | 99.825% |
|---|---|---|---|
| DOVERNOX ® 10 (Tetrakis methylene(3,5-di-t-butyl-4-hydroxyhydrocinnamate)methane) | 0.025% | 0.025% | 0.025% |
| CaSt (calcium stearate) | 0.05% | 0.05% | 0.05% |
| Ex. #5 CHDM copolyphosphite | 0.065% |  |  |
| Comparative Ex. #8 polyphosphite (no CHDM) |  | 0.075% |  |
| Comparative Ex. #8 polyphosphite (no CHDM) |  |  | 0.1% |
| MFI extrusion @ 260° C. | | | |
| $1^{st}$ pass | 6.5 | 5.1 | 6.7 |
| $3^{rd}$ pass | 5.1 | 4.1 | 5.3 |
| $5^{th}$ pass | 3.8 | 3.7 | 4.8 |
| YI extrusion @ 260° C. | | | |
| $1^{st}$ pass | 0.0 | −0.8 | −4.0 |
| $3^{rd}$ pass | 5.2 | 4.8 | 4.4 |
| $5^{th}$ pass | 9.0 | 9.0 | 8.5 |

As illustrated in Table 6, the cylcoaliphatic diol-based polyphosphite performed as well or better in extrusion stability as measured by melt flow index and yellowness index in high density polyethylene, even at lower concentrations than a non-cylcoaliphatic diol-based polyphosphite.

A still further comparison was made between phosphites with cycloaliphatic diols and those without. The following formulations were tested.

TABLE 7

| | | | |
|---|---|---|---|
| Linear Low Density Polyethylene | 99.85% | 99.85% | 99.85% |
| DOVERNOX ® 76 (octadecyl 3,5-di-t-butyl-4-hydroxyhydrocinnamate) | 0.03% | 0.03% | 0.03% |
| TNPP | 0.12% | | |
| Comparative Ex. #8 polyphosphite (non CHDM) | | 0.12% | |
| Ex. #2 CHDM polyphosphite | | | 0.12% |
| MFI extrusion @ 275° C. | | | |
| 1$^{st}$ pass | 1.08 | 0.85 | 1.2 |
| 3$^{rd}$ pass | 0.06 | 0.4 | 1.05 |
| 5$^{th}$ pass | 0.4 | 0.25 | 0.6 |
| YI extrusion @ 260° C. | | | |
| 1$^{st}$ pass | 0.5 | −1.0 | −3.0 |
| 3$^{rd}$ pass | 4.8 | 2.5 | −1.0 |
| 5$^{th}$ pass | 8.0 | 5.9 | 0.1 |

As illustrated in Table 7, the cyloaliphatic diol-based polyphosphite performed better in extrusion stability as measured by melt flow index and yellowness index in linear low density polyethylene than a non-saturated aliphatic diol phosphite.

EXAMPLE #13

The apparatus in Example #1 was used. 45 grams (0.31 mol) of cyclohexane dimethanol, triethyl phosphite (60 g, 0.36 mol), a mixture of lauryl and myristyl alcohol with a hydroxyl number of about 280, (87 g, 0.44 mol), polypropylene glycol with an average molecular weight of 400 (5 g, 0.013 mol), and 0.5 grams of sodium methoxide were added. The mixture was mixed well and heated to approximately 160° C. The pressure was then gradually reduced to 0.3 mm Hg and the temperature was increased to 180° C. over the course of 1 hour. The reaction contents were held at 180° C. under the vacuum for 2 hours at which point no more phenol was distilling out. The vacuum was then broken by nitrogen and the crude product was cooled to ambient temperature. The product was a non-viscous liquid.

EXAMPLE #14

The apparatus in Example #1 was used. 25 grams (0.17 mol) of cyclohexane dimethanol, triphenyl phosphite (114 g, 0.37 mol), a mixture of lauryl and myristyl alcohol with a hydroxyl number of about 280, (92 g, 0.47 mol), polycaprolactone with an average molecular weight of 400 (68 g, 0.17 mol), and 0.5 grams of potassium hydroxide were added. The mixture was mixed well and heated to approximately 160° C. The pressure was then gradually reduced to 0.3 mm Hg and the temperature was increased to 180° C. over the course of 1 hour. The reaction contents were held at 180° C. under the vacuum for 2 hours at which point no more phenol was distilling out. The vacuum was then broken by nitrogen and the crude product was cooled to ambient temperature. The product was a non-viscous liquid.

EXAMPLE #15

The apparatus in Example #1 was used. 87 grams (0.75 mol) of cyclohexane diol, triphenyl phosphite (284 g, 0.92 mol), 98% lauryl alcohol, (236 g, 1.27 mol), polypropylene glycol with an average molecular weight of 400 (6 g, 0.015 mol), and 0.5 grams of potassium hydroxide were added. The mixture was mixed well and heated to approximately 160° C. The pressure was then gradually reduced to 0.3 mm Hg and the temperature was increased to 180° C. over the course of 1 hour. The reaction contents were held at 180° C. under the vacuum for 2 hours at which point no more phenol was distilling out. The vacuum was then broken by nitrogen and the crude product was cooled to ambient temperature. The product was a viscous liquid.

EXAMPLE #16

The apparatus in Example #1 was used. 60 grams (0.42 mol) of cyclohexane dimethanol, triphenyl phosphite (284 g, 0.92 mol), stearyl alcohol, (293 g, 0.85 mol), 1,6 hexane diol (49 g, 0.42 mol), and 1.5 grams of potassium hydroxide were added. The mixture was mixed well and heated to approximately 160° C. The pressure was then gradually reduced to 0.3 mm Hg and the temperature was increased to 180° C. over the course of 1 hour. The reaction contents were held at 180° C. under the vacuum for 2 hours at which point no more phenol was distilling out. The vacuum was then broken by nitrogen and the crude product was cooled to ambient temperature. The product was a viscous liquid.

Characteristics of the various synthesized additives in Examples #13-#16 may be characterized at least in part by the following.

TABLE 8

| | Example # | | | |
|---|---|---|---|---|
| | #13 | #14 | #15 | #16 |
| MP° C. | liq. | liq. | liq. | 40° C. |
| AV | 0.01 | 0.01 | 0.01 | 0.01 |
| % P | 7.6 | 5.8 | 7.9 | 6.6 |
| Avg. MW$_w$ | 18,926 | 15,179 | 4,066 | 29,032 |

COMPARATIVE EXAMPLE #17

The apparatus in Example #1 was used to synthesize a low molecular weight (2,700 M.W., i.e., n=5-6) polyphosphite having CHDM and $C_{12-14}$ alcohols as reactants. 50 grams (0.345 mol) of cyclohexane dimethanol, triphenyl phosphite (126 g, 0.40 mol), a mixture of lauryl and myristyl alcohol with a hydroxyl number of about 280, (112 g, 0.57 mol), and 0.4 grams of potassium hydroxide were added. The mixture was mixed well and heated to approximately 150° C. under nitrogen and held at the temperature for 1 hour. The pressure was then gradually reduced to 0.3 mm Hg and the temperature was held to 150° C. over a course of 1 hour. The reaction contents were held at 150° C. under the vacuum for 2 hours at which point no more phenol was distilling out. The vacuum was then broken by nitrogen and the crude product was cooled to ambient temperature. The product was a non-viscous liquid.

EXAMPLE #18

The apparatus of Example #1 was used to synthesize a high molecular weight (~14,000 M.W.) polyphosphite having CHDM using the identical experimental conditions and quantities of reactants found in Example #17 above.

TABLE 9

| | | |
|---|---|---|
| Linear Low Density Polyethylene | 99.85% | 99.85% |
| DOVERNOX ® 76 (octadecyl 3,5-di-t-butyl-4-hydroxyhydrocinnamate) | 0.03% | 0.03% |
| Comparative Ex. #17 low M.W. CHDM polyphosphite | 0.12% | |
| Ex. #18 high M.W. CHDM polyphosphite | | 0.12% |
| ZnO | 0.015% | 0.015% |
| MFI extrusion @ 190° C. | | |
| $1^{st}$ pass | 0.997 | 1.11 |
| $3^{rd}$ pass | 0.611 | 0.843 |
| $5^{th}$ pass | 0.391 | 0.504 |
| YI extrusion @ 260° C. | | |
| $1^{st}$ pass | −3.90 | −6.00 |
| $3^{rd}$ pass | −0.07 | −3.91 |
| $5^{th}$ pass | 1.7 | −2.4 |
| Hydrolytic stability (50° C. @ 85% RH) | | |
| Initial acid value (AV) | 0.03 | 0.01 |
| 8 hr. AV | 0.14 | 0.02 |
| 24 hr. AV | 3.8 | 1.1 |
| 48 hr. AV | 109 | 66 |

As illustrated in Table 9, the incorporation of a higher molecular weight CHDM polyphosphite shows improved performance over a prior art comparative lower molecular weight CHDM polyphosphite. Equally significantly and perhaps more dramatically, the hydrolytic stability of the higher molecular weight CHDM polyphosphite is improved over its lower molecular weight analog, the improvement manifesting itself at 24 hours, and certainly by 48 hours.

Increased resistance to migration is also seen in comparison to monomeric and oligomieric bisphosphites. Example 42 was replicated from U.S. Pat. No. 5,969,015 to illustrate the differences between the prior art and the present invention in regard to migration into food simulants. Pphosphites with higher molecular weight (n>7) exhibit far lower migration into food simulants. This is important when dealing with polymers that come into contact with foods. Lower migration of polymer additives into foods means lower exposure levels for the public which is very desirable.

COMPARATIVE PRIOR ART EXAMPLE #19

The phosphite of the '015 patent of example #42 was prepared according to the instructions found in example #1 of the '015 patent to produce an oligomeric phosphite as generically illustrated below:

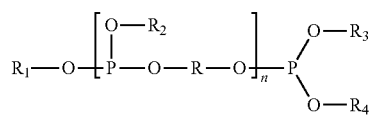

wherein
  n is a number from 1 to 6,
  R is a divalent linking group.

A clean dry reaction vessel which had been thoroughly purged with nitrogen and equipped with a stirrer, thermometer, and distillation apparatus was charged with 217 g of triphenyl phosphite (0.7 mol), 80.4 g dipropylene glycol (0.6 mol), 146 g isodecyl alcohol (0.92 mol), and 1.5 g sodium methoxide catalyst (0.027 m). This mixture was heated to 110° C. and mixed for 3 hours at 110° C. The mixture was cooled to 80° C. at which point the pressure was reduced to begin vacuum distillation followed by an increase in temperature to 150° C. during the vacuum distillation and held for 1 hour at 0.1 mm Hg to ensure all of the phenol was removed. The pale yellow product was filtered with a filter aid and after physical characterization, possessed the following properties.

TABLE 10

| | Example | |
|---|---|---|
| | #19 | #1 |
| MP ° C. | Liquid | 35° C. |
| AV | 0.01 | 0.01 |
| % P | 8.9 | 6.4 |
| Avg. MW | 1,433 | 59,077 |

Prior art example #19 was then compared to example #1 of the present invention in a migration experiment into the food simulant 10% ethanol. The United States Food & Drug Administration ("FDA") dictates that 10% ethanol be used to simulate the migration of a polymer additive contained in a polymer that may contact an alcoholic beverage such as wine or beer.

In the migration experiments, both patent example phosphites were compounded into linear low density polyethylene (LLDPE) at a concentration of 2500 ppm. These were then compression molded into sheets of a thickness of 20 mils. These sheets were cut into discs having a diameter of 1.5 inches (3.8 cm). Five discs of each were then placed into separate clean dry jars with spacers in between each disc to ensure that the 10% ethanol solution could touch both sides of the discs. The discs were then exposed to the 10% ethanol for 2 hours at a temperature of 100° C. The discs and spacers were then removed and the solution was analyzed to measure the amount of phosphite that had migrated from the LLDPE discs into the 10% ethanol.

The ppm in food was then calculated according to the FDA's document: Guidance for Industry-Preparation of Food contact Notifications and Food Additive Petitions for Food Contact Substances: Chemistry Recommendations.

TABLE 11

| | ppm migration in food |
|---|---|
| Prior Art Example #19 | 1.49 |
| Example #1 | 0.073 |

Prior art patent example #19 was chosen because it is an example were n=6 therefore being the most polymeric phosphite of the '015 patent. This shows that the polymeric polyphosphites of the present invention exhibit significantly less migration than the lower molecular weight oligomeric phosphites of the prior art. Migration from the higher molecular weight example #1 is approximately 20 times lower than that of the oligomeric prior art patent example #19.

What has been illustrated above is that the incorporation of CHDM improves the hydrolytic stability of the phosphite additive in that the CHDM rigid structure does not bend due to its saturated ring. It additionally is essentially "odor-free." One embodiment employs approximately 10% by weight of polypropylene glycol ("PPG") in combination with 90% CHDM by weight. The PPG prevents crosslinking and keeps the phosphite a liquid. The increased amounts of CHDM additionally increases the percentage of phosphorus in the molecule, which provides a performance enhancement.

During the synthesis, a combination of monohydroxy and dihydroxy reactants (at least one of which is required to be CHDM) are employed with the triphosphite reactant in a molar ratio which minimizes the number of end-capping hydroxyl groups. Without being held to any theory of reaction or mechanism of operation, an illustrative stylized reaction schematic depiction is illustrated below for Example #7.

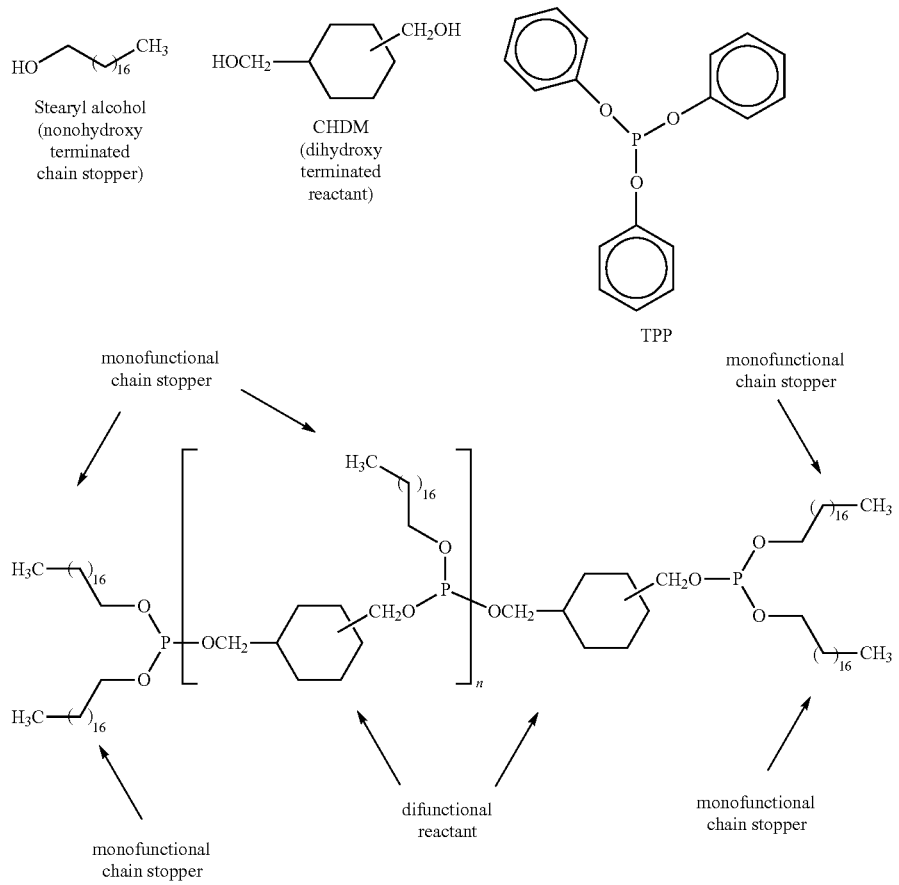

By controlling the molar ratio of reactants, the amount of hydroxy termination is correspondingly controlled. The preferred ratio is approximately 1:1:1 while a more preferred ratio will have the dihydroxy-terminated reactant as the limiting reagent with a slight molar excess of the monofunctional chain stopper. While the graphic depiction is stylized and believed to be an accurate description, the unpredictable nature of chemical reactions prohibits any depiction with absolutely certainty. What is illustrated however, is that while it is possible to have some hydroxy termination in the polyphosphite, i.e., some of the above monofunctional hydroxy moieties may be replaced by dihydroxy moieties. However, by controlling the molar ratio of reactants, the amount of hydroxyl groups at a chain end is preferably limited to no more than 1-2 chains within the molecule, depending on the amount of excess chain stopper.

By employing the methods and techniques described hereinabove, it is possible to control the molecular weight, yellowness index of any polymer/additive combination and hydroxyl termination of alkylphenol-free polyphosphites with minimal terminal hydroxyl groups comprising the steps of:

reacting a triphosphite with a limiting molar amount of a dihydroxy-terminated reactant with a molar excess of a monofunctional chain stopper;

adding a base;

heating said triphosphite, a dihydroxy-terminated reactant wherein said dihydroxy-terminated reactant comprises at least at least one saturated carbocyclic ring and monofunctional chain stopper and base; and further wherein said polymeric polyphosphite is a reaction product of:

at least one monohydroxy-terminated reactant;

at least one dihydroxy-terminated reactant selected from the group HO—[$R^7$]$_a$—$R^8$—[$R^9$]$_b$—OH, where $R^7$ is a linear or branched $C_{1-6}$ alkylene, $R^8$ is a saturated carbocyclic ring having from 5 to 10 carbon atoms in the ring, and $R^9$ is a linear or branched $C_{1-6}$ alkylene, and further wherein a and b are integral values ranging from 0 and 1; and a trifunctional reactant comprising at least one phosphorus moiety; and isolating said alkylphenol-free phosphite.

When forming a copolymer, the process further includes the step of adding at least one second polyalkylene glycol dihydroxy-terminated reactant and wherein the polyalkylene glycol is selected from the group consisting of polyethylene glycol and polypropylene glycol.

What has been demonstrated is that it is possible to design a polymeric polyphosphite that meets all of the required performance attributes without the use of alkylphenols as a secondary antioxidant. The high molecular weight reduces plate-out during process and minimizes exudation/bloom during post-processing. The higher molecular weight also results in reduced volatility and reduced migration and exposure.

Ancillary benefits of the use of phosphites of the invention include increased compatibility with many polymers resulting in reduced plate-out during extrusion and exudation/bloom during post-processing. Plate-out is a result of incompatibility during melt processing and results in material leaving deposits on the equipment such as calendaring mills or the cooling drum/roll during cast film product. Exudation/bloom is a physical characteristic where over time, incompatible phosphites can bloom to the surface of a polymer film (e.g., LLDPE film) after it has been compounded/processed. This results in either dusting/powder or a sticky surface. The higher molecular weight polyphosphite decreases phosphite migration resulting in consumer packaging benefits.

The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. A polymeric polyphosphite containing from 2 to 1000 repeating units of the formula:

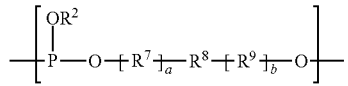

(A)

in which:
R² is derived from a monohydroxy alcohol R²—OH end-capping group and is selected from the group consisting of
a $C_{1-20}$ alkyl group, a $C_{3-22}$ alkenyl group, a $C_{6-40}$ cycloalkyl, a $C_6$ aryl, a $C_{6-40}$ aryl alkyl and Y—OH;
R⁷ and R⁹ are methylene groups;
R⁸ is a cyclohexylene group;
a and b are 1;
and from 1 to 1000 repeating units of the formula:

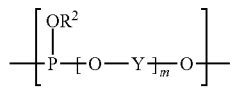

(B)

in which:
Y is selected from the group consisting of a $C_{2-40}$ alkylene group, a $C_{2-40}$ alkyl lactone, a $C_{3-40}$ cycloalkylene group, a $C_6$ arylene group and a $C_{6-40}$ aryl alkylene;
m ranges from 5 to 20;
said polyphosphite being terminated adjacent the —P(OR²)—group of the formula above by a group R¹O—, and terminated at the other end of the chain by a group —P(OR³)(OR⁴), in which each of R¹, R³, and R⁴, which may be the same or different, has one of the meanings given for R².

2. The polymeric polyphosphite of claim 1 wherein R² comprises a $C_{6-10}$ cycloalkyl group.

3. The polymeric polyphosphite of claim 1, wherein Y is a —CH₂CH₂— or —CH(CH₃)CH₂— group.
4. The polymeric polyphosphite of claim 1, wherein R² is a $C_{10-20}$ alkyl group.
5. The polymeric polyphosphite of claim 1, which contains from 10 to 1,000 units of Formula A.
6. A polymer composition which comprises
a synthetic polymer, and
a copolymeric polyphosphite containing from 2 to 1000 repeating units of the formula:

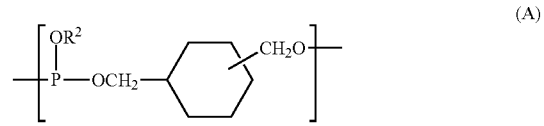

(A)

in which:
R² is selected from the group consisting of
$C_{1-20}$ alkyl, $C_{03-22}$ alkenyl, $C_{6-40}$ cycloalkyl, $C_6$ aryl, $C_{6-40}$ aryl alkyl and Y—OH; and from 1 to 1000 repeating units of the formula:

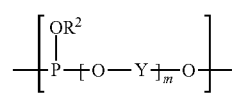

(B)

in which:
Y is selected from the group consisting of $C_{2-40}$ alkylene, $C_{2-40}$ alkyl lactone, $C_{3-40}$ cycloalkylene, $C_6$ arylene and $C_{6-40}$ aryl alkylene;
m ranges from 5 to 20;
said copolymeric polyphosphite being terminated adjacent the —P(OR²)— group of the formula above by a group R¹O—, and terminated at the other end of the chain by a group —P(OR³)(OR⁴), in which each of R¹, R³, and R⁴, which may be the same or different and has one of the meanings given for R².

7. The polymer composition of claim 6 wherein,
the synthetic polymer is a polyolefin.
8. The polymer composition of claim 6 wherein R² comprises a $C_{6-10}$ cycloalkyl.
9. The polymer composition of claim 6, wherein Y is a —CH₂CH₂— or —CH(CH₃)CH₂— group.
10. The polymer composition of claim 6, wherein R² is a $C_{10-20}$ alkyl group.
11. A polymer composition which comprises
a polyolefin polymer, and
a homopolymeric polyphosphite containing from 15 to 1000 repeating units of the formula:

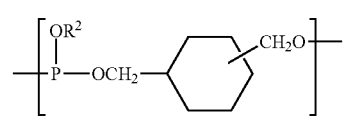

(A)

in which:
R² is selected from the group consisting of
$C_{1-20}$ alkyl, $C_{3-22}$ alkenyl, and $C_{2-20}$ polyalkylene glycol chain terminated by a $C_{1-4}$ alkyl group;
said polyphosphite being terminated adjacent the —P(OR²)— group of the formula above by a group R¹O—, and terminated at the other end of the chain by a group —P(OR³)(OR⁴), in which each of $R^1$, $R^3$, and $R^4$, which may be the same or different, has one of the meanings given for $R^2$;

said homopolymeric polyphosphite having a weight average molecular weight from 6,000 to 100,000.

12. The polymer composition of claim 11, wherein the $C_{2-20}$ polyalkylene glycol chain terminated by a $C_{1-4}$ alkyl group is selected from the group consisting of a polyethylene glycol terminated by a methyl group and a tripropylene glycol terminated by a butyl group.

13. The polymer composition of claim 11, wherein $R^2$ is a $C_{10-20}$ alkyl group.

* * * * *